United States Patent
Saito

(10) Patent No.: US 8,169,704 B2
(45) Date of Patent: May 1, 2012

(54) IMAGE DISPLAY APPARATUS

(75) Inventor: Kenichi Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 12/330,997

(22) Filed: Dec. 9, 2008

(65) Prior Publication Data

US 2009/0147362 A1     Jun. 11, 2009

(30) Foreign Application Priority Data

Dec. 11, 2007   (JP) .................................. 2007-319250

(51) Int. Cl.
*G02B 5/18*   (2006.01)

(52) U.S. Cl. ....................................................... 359/569

(58) Field of Classification Search .............. 359/13–14, 359/569–576
See application file for complete search history.

(56) References Cited

U.S. PATENT DOCUMENTS

| 5,044,706 A |   | 9/1991 | Chen |       |
|---|---|---|---|---|
| 5,623,365 A | * | 4/1997 | Kuba | ........................... 359/569 |
| 5,801,889 A |   | 9/1998 | Meyers et al. |   |
| 2002/0008911 A1 | * | 1/2002 | Sekine | .......................... 359/566 |
| 2003/0189755 A1 | * | 10/2003 | Okuno | .......................... 359/569 |
| 2005/0140644 A1 | * | 6/2005 | Mukawa | ....................... 345/156 |

FOREIGN PATENT DOCUMENTS

| JP | 09-127322 A | 5/1997 |
|---|---|---|
| JP | 10-133149 A | 5/1998 |
| JP | 10-268115 A | 10/1998 |
| JP | 2003-294924 A | 10/2003 |
| JP | 2005-292571 A | 10/2005 |

* cited by examiner

*Primary Examiner* — Stephone Allen
*Assistant Examiner* — Kimberly N Kakalec
(74) *Attorney, Agent, or Firm* — Canon U.S.A., Inc. IP Division

(57) ABSTRACT

The image display apparatus includes an image-forming element, an optical system guiding light from the image-forming element to an exit pupil, and a diffractive optical element disposed between the image-forming element and the optical system or between the optical system and the exit pupil. The diffractive optical element includes plural diffraction grating portions formed of mutually different materials. Each of the diffraction grating portions includes plural grating rings each having a grating surface and a grating side surface. In each of the grating rings, the grating side surface is inclined oppositely to the grating surface with respect to a normal to an enveloping surface passing through apexes of the plural grating rings. The diffractive optical element satisfies the following conditions at least when $k=k_E$: $\theta_d(j, k)=\sin^{-1}[\{n_i \cdot \sin\theta_i(j, k)-m(j, k)\cdot\lambda/P(j, k)\}/n_d] \leq \theta_i(j, k)$, $M(k)=\Sigma\{m(j, k)\}=$const, and $\theta_d(j, k) \leq \theta \leq \theta_i(j, k)$.

4 Claims, 12 Drawing Sheets

IMAGE DISPLAY APPARATUS

BACKGROUND OF THE INVENTION

The present invention relates to an image display apparatus such as a head-mounted display (HMD) that uses a diffractive optical element.

A method for correcting chromatic aberrations in an optical system is known which uses a diffractive optical element having opposite chromatic aberration characteristics to those of a refractive surface (see U.S. Pat. No. 5,044,706). The diffractive optical element is also used for correction of aberrations other than chromatic aberrations, since it can have an effect as an aspheric surface by suitably setting its grating period.

When using such a diffractive optical element, it is desirable to design the diffractive optical element such that only diffracted light having a specific diffraction order (hereinafter referred to as "design diffraction order") is generated from the diffractive optical element and that no diffracted light is generated in other diffraction orders.

In practice, however, when diffraction efficiency is determined in scalar approximation in, for example, a single-layer diffractive optical element, a diffraction efficiency of 100% for design diffraction order light can be achieved only when light of a specific wavelength (hereinafter referred to as "design wavelength") enters the diffractive optical element at a specific incident angle. Thus, when the wavelength or incident angle of the entering light is offset from the design wavelength or the specific incident angle, the diffraction efficiency of the design diffraction order light decreases in increments of 10%. The decrease in the diffraction efficiency of the design diffraction order light increases diffracted light of other diffraction orders, which significantly deteriorates the performance of the optical system (see FIG. 1).

Meanwhile, Japanese Patent Laid-Open Nos. 9-127322 and 10-133149 disclose diffractive optical elements that achieve a high diffraction efficiency over a wide wavelength range. In these diffractive optical elements, plural diffraction grating portions formed of materials having mutually different dispersions are adjacently disposed. The diffraction order and grating height in the respective diffraction grating portions are adjusted, and thereby unnecessary light is reduced in a visible light wavelength range. Using materials with a large difference in dispersion for these diffraction grating portions makes it possible to achieve a scalar diffraction efficiency of near 100% over the entire visible light wavelength range.

Nevertheless, there are some cases where even the diffractive optical elements disclosed in Japanese Patent Laid-Open Nos. 9-127322 and 10-133149 cannot sufficiently reduce unnecessary light.

When the diffraction grating portion has a so-called blazed structure in which each of gratings in the diffraction grating portion has a grating surface 1 and a grating side surface 2 as shown in FIG. 2, light that has entered the grating side surface 2 at a certain angle is reflected or refracted at that grating side surface 2 and passes through the diffraction grating portion without being diffracted. Such non-diffracted light proceeds to a different direction from that of diffracted light of an original design diffraction order and becomes unnecessary light in the optical system.

To address this phenomenon, diffractive optical elements that reduce unnecessary light generated at grating side surfaces are disclosed in U.S. Pat. No. 5,801,889, and Japanese Patent Laid-Open Nos. 10-268115, 2003-294924, and 2005-292571.

In the diffractive optical element disclosed in U.S. Pat. No. 5,801,889, the radius of curvature of an enveloping surface of plural grating grooves and the angles of the grating side surfaces are optimized such that incident light hardly enters the grating side surfaces. In each diffractive optical element disclosed in Japanese Patent Laid-Open Nos. 10-268115, 2003-294924, and 2005-292571, the angle of incident light or emergent light is made equal to the angle of the grating side surface so as to reduce unnecessary light generated at the grating side surface.

However, even the diffractive optical elements disclosed in U.S. Pat. No. 5,801,889, and Japanese Patent Laid-Open Nos. 10-268115, 2003-294924, and 2005-292571 cannot sufficiently remove unnecessary light if the grating pitch is extremely small, e.g., several tens μm. In particular, in a diffractive optical element that combines plural diffraction grating portions, each grating has a height that is several to ten times higher than that of a single-layer diffractive optical element. Thus, the ratio of grating height relative to the grating pitch is larger. This indicates that the ratio of light rays impinging on the grating side surfaces relative to normally diffracted light rays increases.

When considering a case in which light rays enter a diffractive optical element having a shape shown in FIG. 3A, the diagram on the left side in FIG. 3A shows a central portion (portion around an optical axis) of the diffractive optical element, and the diagram on the right side shows a peripheral portion of this diffractive optical element. For the sake of simplicity, an enveloping surface 3 passing through apexes of plural gratings (grating tips) is indicated as a plane perpendicular to the optical axis, while the grating side surfaces 2 are indicated as planes parallel to the optical axis.

When the light rays enter this diffractive optical element parallel to the optical axis, they hardly impinge on the grating side surfaces 2, and a high diffraction efficiency is achieved in the design diffraction order.

On the other hand, when the light rays enter at a certain incident angle relative to the optical axis, the ratio of light rays entering the grating side surfaces 2 instead of the grating surfaces 1 increases as the incident angle increases. In this case, the ratio of the light rays impinging on the grating side surfaces 2 can be decreased by inclining the grating side surfaces 2 at an angle equal to the incident angle of the light rays as shown in FIG. 3B.

FIG. 4 shows a two-layer (multilayer) diffractive optical element having two diffraction grating portions with different dispersions which are facingly disposed with an air layer (gap) interposed therebetween in order to achieve a high diffraction efficiency over a wide wavelength range. A design diffraction order of the diffractive optical element in FIG. 4 is represented as M, and an entrance side diffraction grating portion is referred to as a first diffraction grating portion, while a diffraction side (emergent side) diffraction grating portion is referred to as a second diffraction grating portion. The first diffraction grating portion has a positive optical power, while the second diffraction grating portion has a negative optical power. Refractive indexes of an entrance side medium of the first diffraction grating portion and a diffraction side medium of the second diffraction grating portion are designated by $n_1$ and $n_2$, respectively.

An incident angle on the first diffraction grating portion is designated by $\theta_1$, while a diffraction angle in the design diffraction order by the first diffraction grating portion is designated by $\theta_2$ as shown in FIG. 5A. $\theta_2$ is also the incident angle on the second diffraction grating portion. A diffraction angle in the design diffraction order by the second diffraction grating portion is designated by $\theta_3$. Since the design diffraction order of the entire diffractive optical element including these two diffraction grating portions is an M-th order, the relationship between $\theta_1$ and $\theta_3$ is expressed as follows:

$$\theta_3(k)=\sin^{-1}[\{n_1\cdot\sin\theta_1(k)-M\cdot\lambda/P(k)\}/n_2]$$

where k represents a number of each grating when the number of an innermost grating is 1, P represents a grating pitch of a k-th grating (grating pitch between the k-th grating and a (k−1)-th grating), and λ represents a design wavelength.

In order to achieve a high diffraction efficiency over a wide wavelength range, an optimal diffraction order in the first and second diffraction grating portions needs to be respectively determined. This will in turn determine a grating height in each diffraction grating portion, as well as $\theta_2$. When M is a fixed value, the respective design diffraction orders designated by $m_1$ and $m_2$ in the first and second diffraction grating portions must satisfy the following condition:

$$M=m_1+m_2.$$

The incident angle $\theta_2$ on the second diffraction grating portion depends on the design diffraction orders of the respective diffraction grating portions. The relationships between $\theta_1$, $\theta_2$, and $\theta_3$ will be either of the following depending on the value of $\theta_2$, as shown in FIG. 5A and FIG. 6A:

$$\theta_1\geq\theta_2, \theta_2\leq\theta_3 \quad (11)$$

or $$\theta_1\leq\theta_2, \theta_2\geq\theta_3 \quad (12).$$

If the relationship of the expression (11) arises, as shown in FIG. 5B, light rays 101 and 201 entering grating surfaces 11 and 21 of the first diffraction grating portion at an incident angle of $\theta_1$ are diffracted at the first diffraction grating portion and proceed in a direction of $\theta_2$. In this case, if a grating side surface 13 of the first diffraction grating portion is inclined at an angle equal to the incident angle $\theta_1$, the light ray 101 that has entered near a grating groove of the grating surface 11 proceeds in a direction away from the grating side surface 13 and does not impinge thereon.

The light ray 201 that has entered near a grating groove of a grating surface 21 proceeds parallel to the grating side surface 13 and is correctly diffracted without impinging on the grating side surface 13. In this case, unnecessary light generated at the grating side surface 13 of the first diffraction grating portion is reduced.

On the other hand, if a grating side surface 14 of the second diffraction grating portion is inclined at an angle equal to the incident angle $\theta_2$, the light ray 102 that has entered near a grating groove of the grating surface 12 at an incident angle of $\theta_2$ is diffracted at a diffraction angle of $\theta_3$ to proceed towards the grating side surface 14 and impinges thereon. The light ray 202 that has entered near a grating groove of a grating surface 22 proceeds parallel to the grating side surface 14 and is correctly diffracted without impinging on the grating side surface 14.

If the relationship of the expression (12) arises, light rays impinging on the grating side surface 14 in the second diffraction grating portion are reduced, as shown in FIG. 6B. However, in the first diffraction grating portion, the light ray 101 that has entered near the grating groove of the grating surface 11 at the incident angle of $\theta_1$ is diffracted at the diffraction angle of $\theta_2$ to proceed towards the grating side surface 13 and impinges thereon.

These problems arise when the diffraction angle is larger than the incident angle. If the inclination angle of the grating side surface is made equal to the diffraction angle, but not equal to the incident angle so that the diffracted light ray does not proceed towards the grating side surface, then the grating side surface will be parallel to the diffracted light ray so that the diffracted light ray impinging on the grating side surface can be reduced. However, in this case, a light ray before being diffracted impinges on the grating side surface 13 as shown in FIG. 7, and therefore unnecessary light cannot be sufficiently removed.

When the grating pitch P is sufficiently large as compared to the grating height d, for example, if P=200 μm and d=10 μm, then a ratio d/P is as small as 0.05, which is allowable, since this means that a proportion (intensity) of unnecessary light relative to the light correctly diffracted in the direction of the design diffraction order at the grating surface is made small. However, if P=20 μm and d=8 μm, for example, then the ratio d/P is 0.4, in which case the proportion of the unnecessary light reaches a non-negligible level.

BRIEF SUMMARY OF THE INVENTION

The present invention provides an image display apparatus, which uses a diffractive optical element that can reduce light rays impinging on grating side surfaces even when a grating pitch is small and an incident angle of entering light rays is large, and which is thus capable of reducing unnecessary light such as flare light.

The present invention provides as an aspect thereof an image display apparatus which includes an image-forming element configured to form an original image, an optical system configured to guide light from the image-forming element to an exit pupil, and a diffractive optical element disposed between the image-forming element and the optical system or between the optical system and the exit pupil. The diffractive optical element includes plural diffraction grating portions formed of mutually different materials, the plural diffraction grating portions being disposed with a gap therebetween. Each of the diffraction grating portions includes plural grating rings each having a grating surface and a grating side surface. In each of the grating rings, the grating side surface is inclined oppositely to the grating surface with respect to a normal to an enveloping surface passing through apexes of the plural grating rings. The diffractive optical element satisfies the following conditions for a k-th grating ring of the plural grating rings in a j-th diffraction grating portion of the plural diffraction grating portions, at least when $k=k_E$:

$$\theta_d(j,k)=\sin^{-1}[\{n_i\cdot\sin\theta_i(j,k)-m(j,k)\cdot\lambda/P(j,k)\}/n_d]\leq\theta_i(j,k)$$

$$M(k)=\sum_{j=1}^{s}\{m(j,k)\}=const.$$

$$\theta_d(j,k)\leq\theta\leq\theta_i(j,k)$$

where:

λ represents a design wavelength of the diffractive optical element;

$\theta_i(j,k)$ represents an angle formed by a light ray passing through the k-th grating ring in the j-th diffraction grating portion and the exit pupil with the normal to the enveloping surface, $|\theta_i(j,k)|$ being smaller than a maximum view angle of the optical system;

$\theta_d(j,k)$ represents a diffraction angle of light of a design diffraction order at the k-th grating ring in the j-th diffraction grating portion;

m(j, k) represents the design diffraction order of the k-th grating ring in the j-th diffraction grating portion;

P(j, k) represents a pitch between the k-th grating ring and a (k−1)-th grating ring;

$k_E$ represents a number of the grating ring where the pitch is minimum or where $\theta_i(j, k)$ is maximum;

M(k) represents a diffraction order of the diffractive optical element;

$n_i$ and $n_d$ respectively represent refractive indexes of an entrance side medium and a diffraction side medium in the j-th diffraction grating portion;

s represents a total number of the plural grating rings in the j-th diffraction grating portion; and θ represents an angle which the grating side surface forms with the normal to the enveloping surface.

The present invention provides as another aspect thereof an image display apparatus which includes an image-forming element configured to form an original image, an optical system configured to guide light from the image-forming element to an exit pupil, and a diffractive optical element disposed between the image-forming element and the optical system or between the optical system and the exit pupil. The diffractive optical element includes plural diffraction grating portions formed of mutually different materials, the plural diffraction grating portions being disposed with a gap therebetween. Each of the diffraction grating portions includes plural grating rings each having a grating surface and a grating side surface. In each of the grating rings, the grating side surface is inclined to a same side as the grating surface with respect to a normal to an enveloping surface passing through apexes of the plural grating rings. The diffractive optical element satisfies the following conditions for a k-th grating ring of the plural grating rings in a j-th diffraction grating portion of the plural diffraction grating portions, at least when $k=k_E$:

$$\theta_d(j, k) = \sin^{-1}[\{n_i \cdot \sin\theta_i(j, k) - m(j, k) \cdot \lambda / P(j, k)\} / n_d] \geq \theta_i(j, k)$$

$$M(k) = \sum_{j=1}^{s} \{m(j, k)\} = const.$$

$$\theta_i(j, k) \leq \theta \leq \theta_d(j, k)$$

where:

λ represents a design wavelength of the diffractive optical element;

$\theta_i(j, k)$ represents an angle formed by a light ray passing through the k-th grating ring in the j-th diffraction grating portion and the exit pupil with the normal to the enveloping surface, $|\theta_i(j, k)|$ being smaller than a maximum view angle of the optical system;

$\theta_d(j, k)$ represents a diffraction angle of light of a design diffraction order at the k-th grating ring in the j-th diffraction grating portion;

m(j, k) represents the design diffraction order of the k-th grating ring in the j-th diffraction grating portion;

P(j, k) represents a pitch between the k-th grating ring and a (k−1)-th grating ring;

$k_E$ represents a number of the grating ring where the pitch is minimum or where $\theta_i(j, k)$ is maximum;

M(k) represents a diffraction order of the diffractive optical element;

$n_i$ and $n_d$ respectively represent refractive indexes of an entrance side medium and a diffraction side medium in the j-th diffraction grating portion;

s represents a total number of the plural grating rings in the j-th diffraction grating portion; and θ represents an angle which the grating side surface forms with the normal to the enveloping surface.

Other aspects of the present invention will become apparent from the following description and the attached drawings.

DETAILED DESCRIPTION OF THE EMBODIMENTS

Figure 1:
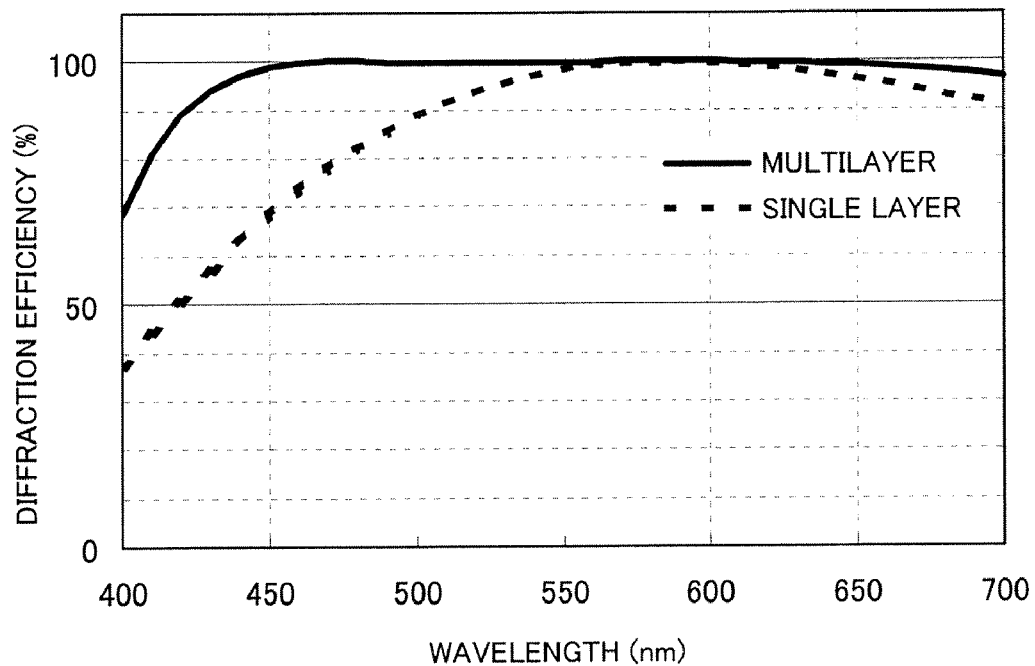
FIG. 1 is a graph showing wavelength dependency of scalar diffraction efficiencies of conventional single-layer and multilayer diffractive optical elements.
Figure 2:
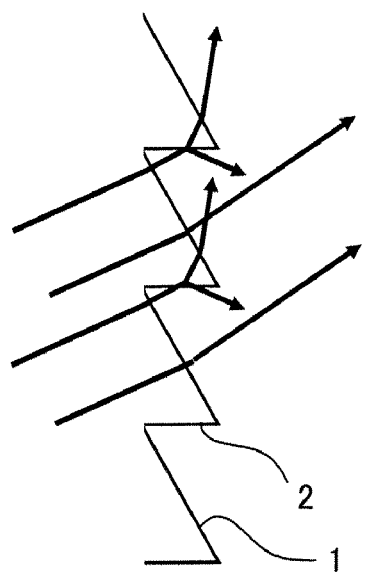
FIG. 2 is a diagram for explaining impingement of light rays on grating side surfaces when the light rays diagonally enter a conventional diffractive optical element.
Figure 3A:
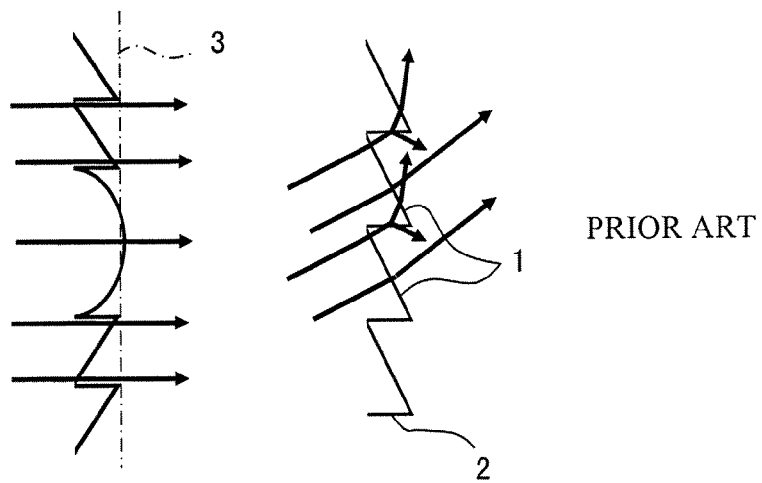
FIG. 3A is a diagram showing the presence and absence of influences of grating side surfaces when light rays perpendicularly and diagonally enter a conventional diffractive optical element.
Figure 3B:
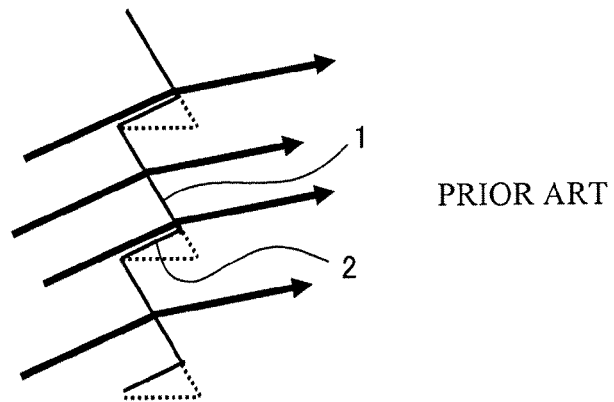
FIG. 3B is a diagram showing an example in which the grating side surfaces are inclined in the diffractive optical element of FIG. 3A.
Figure 4:
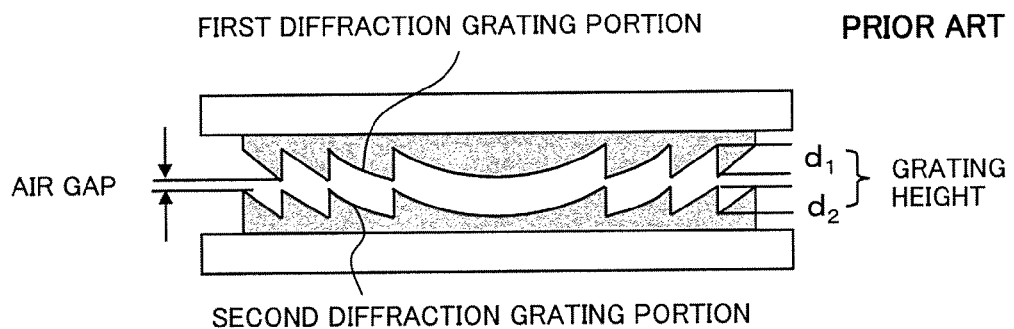
FIG. 4 is a diagram showing a schematic structure of a conventional two-layer diffractive optical element.
Figure 5A:
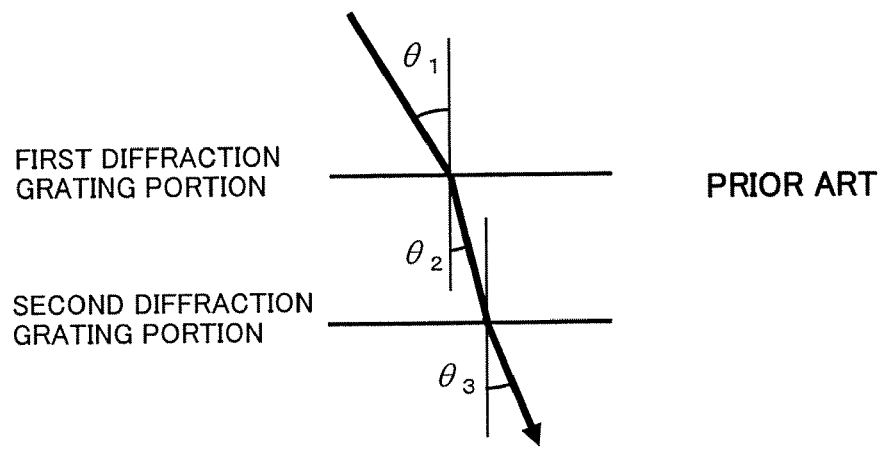
FIG. 5A is a diagram for explaining incident angles and diffraction angles in the two-layer diffractive optical element of FIG. 4.
Figure 5B:
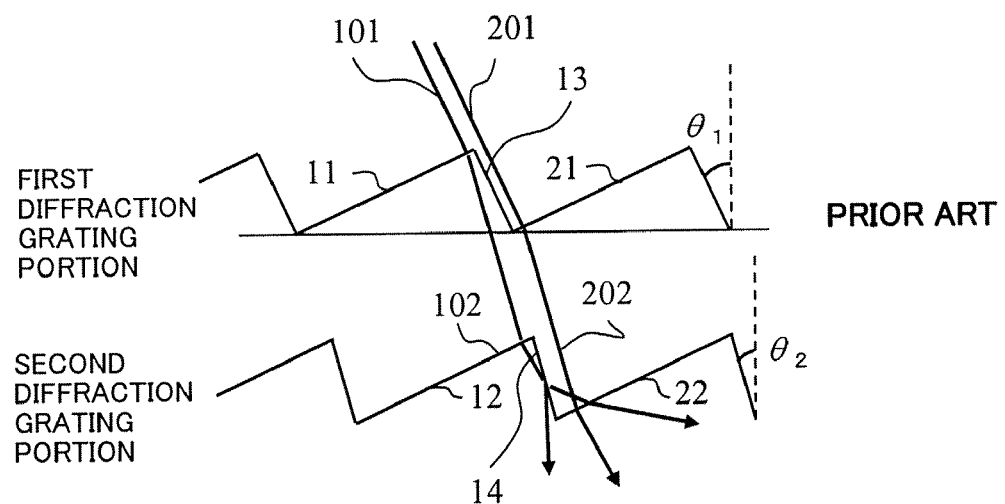
FIG. 5B is a diagram for explaining generation of unnecessary light at grating side surfaces of the two-layer diffractive optical element of FIG. 5A.

Exemplary embodiments of the present invention will hereinafter be described with reference to the accompanying drawings.

First, description will be made of a diffractive optical element used in an image display apparatus that is an embodiment of the present invention. The diffractive optical element includes plural diffraction grating portions formed of mutually different materials and (adjacently) disposed with a gap (air layer) therebetween. The diffraction grating portion can be rephrased as a diffraction grating surface.

Each of the diffraction grating portions includes plural grating rings each having a grating surface and a grating side surface. The diffractive optical element satisfies the following conditions in a k-th grating ring from a ring center side of the plural grating rings formed in a j-th diffraction grating portion from a light entrance side of the plural diffraction grating portions, where at least $k=k_E$. In other words, an angle θ made by the grating side surface of the k-th grating ring and a normal to an enveloping surface (hereinafter referred to as "tip enveloping surface") passing through apexes (hereinafter referred to as "grating tips") of the plural grating rings in the j-th diffraction grating portion satisfies the following conditions.

1. When the grating side surfaces are inclined oppositely to the grating surfaces with respect to the normal to the tip enveloping surface (normal at each grating tip position), that is, when the grating side surfaces are inclined to a side on which an angle made by the grating side surface and the grating surface (grating apex angle) is larger than that when the grating side surfaces are parallel to the above-described normal.

$$\theta_d(j,k) = \sin^{-1}[\{n_i \cdot \sin\theta_i(j,k) - m(j,k) \cdot \lambda / P(j,k)\}/n_d] \le \theta_i(j,k) \quad (1)$$

$$M(k) = \sum_{j=1}^{s} \{m(j,k)\} = const. \quad (2)$$

$$\theta_d(j,k) \le \theta \le \theta_i(j,k) \quad (3)$$

where λ represents a design wavelength of the diffractive optical element, which is a wavelength of light entering the diffractive optical element (also referred to as a "used wavelength").

"$\theta_i(j, k)$" represents an angle formed by a light ray passing through the k-th grating ring in the j-th diffraction grating portion and an exit pupil of an ocular optical system which will be described later with respect to the normal to the tip enveloping surface. "$|\theta_i(j, k)|$" is smaller than a maximum view angle of the ocular optical system.

"$\theta_d(j, k)$" represents a diffraction angle of design diffraction order light in the k-th grating ring in the j-th diffraction grating portion.

"m(j, k)" represents a design diffraction order of the k-th grating ring in the j-th diffraction grating portion.

"P(j, k)" represents a pitch (grating ring pitch) between the k-th grating ring and a (k−1)-th grating ring, which will be hereinafter referred to as a "k-th grating ring pitch".

"$k_E$" represents a number of a grating ring where the grating ring pitch is minimum or where $\theta_i(j, k)$ is maximum.

"M(k)" represents a diffraction order of the diffractive optical element, which is a sum of diffraction orders of the plural diffraction grating portions.

"$n_i$" and "$n_d$" respectively represent refractive indexes of an entrance side medium and a diffraction side medium in the j-th diffraction grating portion.

"s" represents a total number of the plural grating rings in the j-th diffraction grating portion.

In a diffractive optical element (multilayer diffractive optical element) having plural diffraction grating portions (diffraction grating surfaces) formed of mutually different materials and adjacently disposed, a high diffraction efficiency is achieved over a wide wavelength range by setting a suitable design diffraction order for each of the diffraction grating portions. Such a multilayer diffractive optical element is disclosed in Japanese Patent Laid-Open Nos. 9-127322 and 10-133149.

Figure 8:
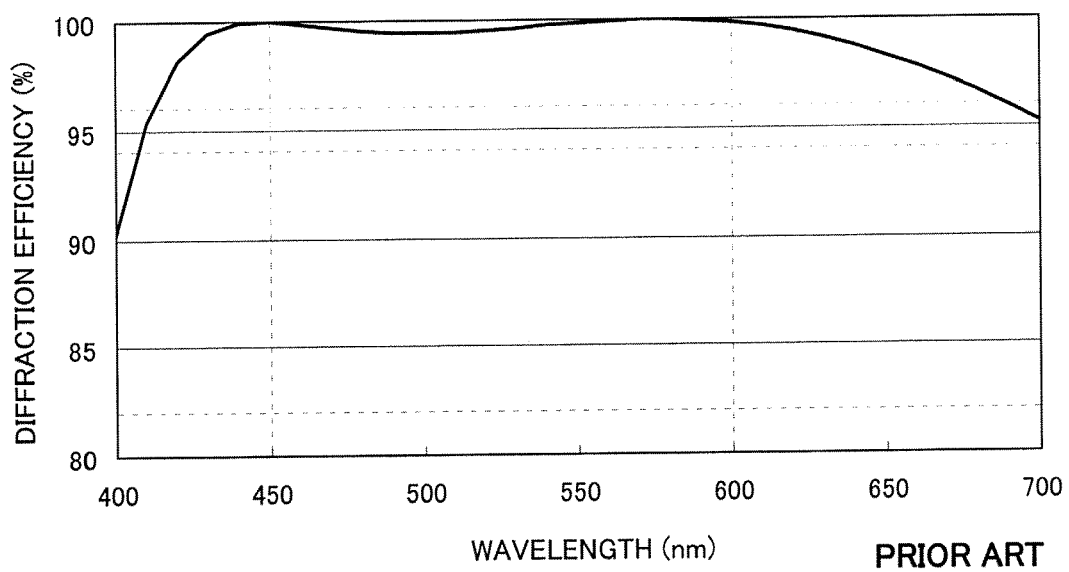
FIG. 8 is a graph showing an example of scalar diffraction efficiency relative to wavelengths of a conventional two-layer diffractive optical element.

FIG. 8 shows an example of scalar diffraction efficiency for wavelengths of a conventional two-layer (multilayer) diffractive optical element. In this example, an ultraviolet curable resin having a refractive index of $N_d$=1.52415 and a dispersion of $v_d$=51.57 is used for the first (j=1) diffraction grating portion. For the second (j=2) diffraction grating portion, an ultraviolet curable resin having a refractive index of $N_d$=1.63554 and a dispersion of $v_d$=22.75 is used. An air layer is provided, as an intermediate layer, between the first diffraction grating portion and the second diffraction grating portion. An incident angle of light rays onto the diffractive optical element is 20°.

The two-layer diffractive optical element provides a diffraction efficiency of 98% or more in a wavelength range of 430 to 650 nm, showing good performance.

However, the scalar diffraction efficiency is a value obtained by calculation with an ideal approximation taking only an optical path difference into consideration, and influences of a minute structure of gratings are not taken into account. A strict calculation of diffraction efficiency requires analysis computation that handles light as electromagnetic waves.

The incident angle $\theta_i(j, k)$ onto the k-th grating ring in the j-th diffraction grating portion and the diffraction angle $\theta_d(j, k)$ of the light of the design diffraction order are represented by the above expression (1) for the design diffraction order $m(j, k)$.

Figure 6A:
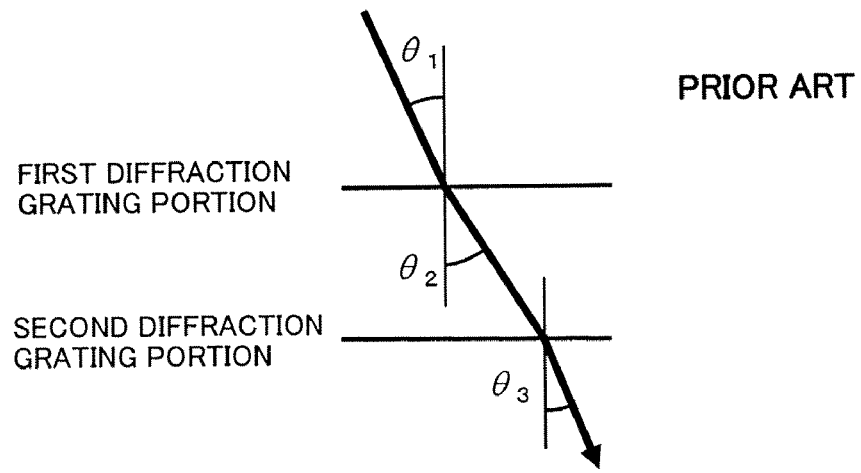
FIG. 6A is a diagram for explaining incident angles and diffraction angles in the two-layer diffractive optical element of FIG. 4.
Figure 6B:
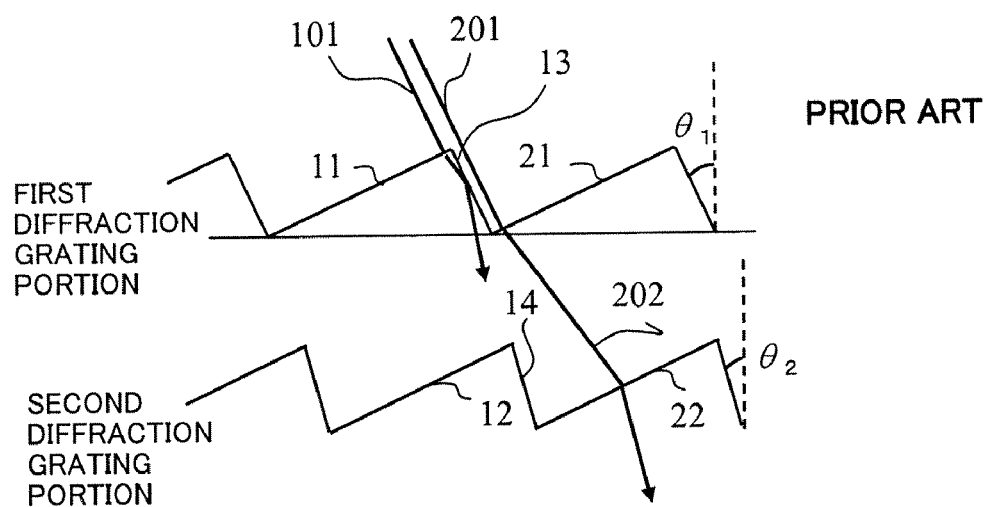
FIG. 6B is a diagram for explaining generation of unnecessary light at grating side surfaces of the two-layer diffractive optical element of FIG. 6A.
Figure 7:
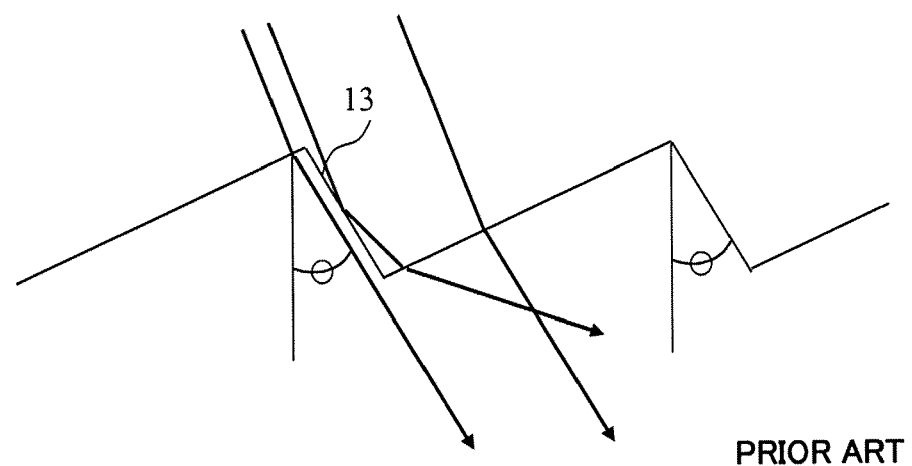
FIG. 7 is a diagram for explaining generation of unnecessary light when grating side surfaces are inclined in the conventional diffractive optical element.

Even when the grating side surface is inclined with respect to the above normal oppositely to the grating surface, for example at the same angle as the incident angle of the entering light, under the condition in which $\theta_d > \theta_i$ is established, a component that impinges on the grating side surface at a certain angle and then is reflected or transmitted remains (see FIG. 6B). The component can be ignored when the grating ring pitch is large.

However, when the grating ring pitch is small and the ratio of (grating height d)/(grating ring pitch P) is large, the actual diffraction efficiency for the design diffraction order is lowered than the value shown in FIG. 8, with unnecessary light being increased, and the influences thereof on the performance of an optical system using this diffractive optical element is not negligible.

In the case with a single-layer diffractive optical element, when designing the entire optical system, a determination of an optical power given to the single-layer diffractive optical element will unambiguously determine the relationship between the incident angle and the diffraction angle of design diffraction order light. Therefore, even if light rays with the condition $\theta d > \theta i$ are generated, the relationship cannot be changed, because changing it will alter the optical power of the diffractive optical element, too.

However, with a multilayer diffractive optical element having plural (first to s-th) diffraction grating portions, it is only necessary that an incident angle onto the first diffraction grating portion closest to an entrance side and an emergent angle (diffraction angle) from the s-th diffraction grating portion closest to an exit side maintain a relationship corresponding to a predetermined optical power. Therefore, a diffraction angle in the (s−1)-th diffraction grating portion can be arbitrarily determined based on the diffraction angle in the first diffraction grating portion. Accordingly, setting the diffraction order m (j, k) such as to satisfy $\theta d(j, k) \leq \theta i(j, k)$ for the j-th (j=1~s) diffraction grating portion can suppress generation of light rays impinging the grating side surface, whereby unnecessary diffracted light can be reduced.

In this case, m(j, k) is required to satisfy the conditional expression (2). For example, when the design diffraction order M(k) of the entire diffractive optical element is −1, the following conditional expression must be satisfied at a design wavelength $\lambda$:

$$M(k) = \sum_{j=1}^{s} \{m(j,k)\} = -1.$$

Thus, upon satisfying the conditional expressions (1) and (2), m(j, k) is set for the respective diffraction grating portions so as to secure the diffraction efficiency for the design diffraction order M of the entire diffractive optical element over a wide wavelength range.

In this case, when compared to a case in which m(j, k) is set for each diffraction grating portion such as to make the wavelength range in which a high diffraction efficiency is achieved the widest without satisfying the conditional expression (1), satisfying the conditional expression (1) decreases the scalar diffraction efficiency for the design diffraction order on a short wavelength side and a long wavelength side. However, if the conditional expression (1) is not satisfied, the above-mentioned influences of the grating structure will be large when the ratio d/P is as large as to exceed 0.2. Therefore, the actual unnecessary diffraction order light will be larger than one determined by scalar approximation calculation. Accordingly, better performance is achieved by satisfying the conditional expression (1).

It is, in practice, difficult to satisfy the conditional expression (1) in all of the grating rings. This is because an attempt to satisfy the conditional expression (1) in an area where the grating ring pitch is large, where generally k is small, leads to a decrease in diffraction efficiency particularly on the short wavelength side.

When the grating ring pitch is large, the ratio d/P is small and the above-mentioned influences are small. Therefore, the conditional expression (1) need not be satisfied.

Since this embodiment is effective to a case where the grating ring pitch is small and the ratio d/P is large or a case where the incident angle is large, the conditional expression (1) need only be satisfied in such an area where the kE-th grating ring exists. Of course, it is preferable that the conditional expression (1) be satisfied in grating rings other than the kE-th one. This also applies to conditional expressions (2) and (3), and (7) and (8), which are described later.

Figure 9:
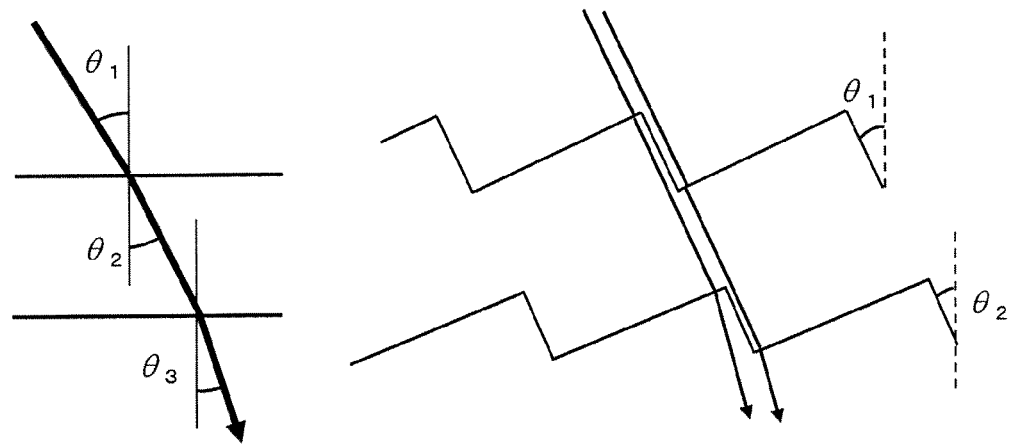
FIG. 9 is a conceptual diagram showing how light rays proceed when conditional expression (1) is satisfied in a diffractive optical element that is an embodiment of the present invention.

The kE-th grating ring is a grating ring with a smallest grating ring pitch of all the grating rings, or a grating ring with an incident angle of a light ray entering this grating ring being the largest. FIG. 9 shows how the light ray proceeds when the conditional expression (1) is satisfied.

In FIG. 9, the angles $\theta 1$ to $\theta 3$ satisfy the relationships $\theta 2 \leq \theta 1$ and $\theta 3 \leq \theta 2$, where $\theta 1 = 21.60$ [°], $\theta 2 = 19.83$ [°], and $\theta 3 = 19.32$ [°].

Figure 21:
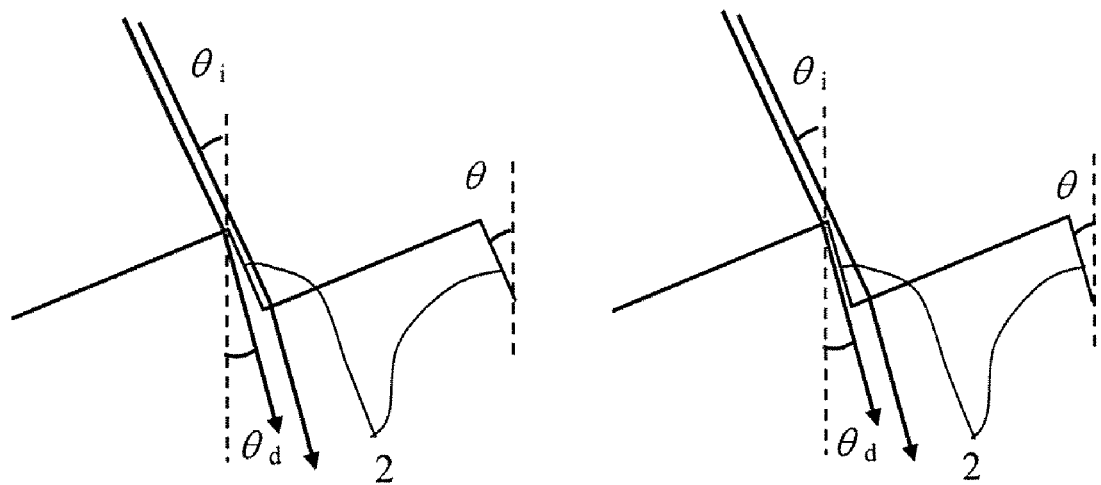
FIG. 21 is a diagram for explaining conditional expression (3) in the embodiment.

Upon satisfying the conditional expressions (1) and (2), it is necessary to also take into account an inclination of each grating side surface in each diffraction grating portion. In this embodiment, as shown in FIG. 21, an inclination angle $\theta$ of the grating side surface 2 with respect to a normal to the tip enveloping surface 3 at the grating tip position in the k-th grating ring of the j-th diffraction grating portion satisfies the conditional expression (3). Namely, if the inclination angle $\theta$ of the grating side surface 2 is smaller than the incident angle $\theta i(j, k)$ of the light ray onto that grating ring and is larger than the diffraction angle $\theta d(j, k)$, there are almost no light rays impinging on the grating side surface 2 at a certain angle. Accordingly, generation of unnecessary light is suppressed.

It is more preferable that the grating ring height (grating height) d(j, k) satisfy the following condition:

$$d(j,k) \leq m(j,k) \cdot \lambda / \{ni \cdot \cos \theta i(j,k) - nd \cdot \cos \theta d(j,k)\} \qquad (4).$$

Figure 10:
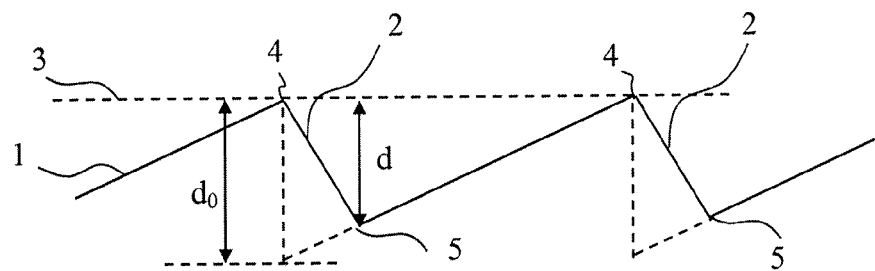
FIG. 10 is a diagram showing definition of a grating height when grating side surfaces are inclined in the diffractive optical element of the embodiment.

As shown in FIG. 10, the grating height d(j, k) is a distance (height) between the grating tip 4 and a lowermost point in the grating groove 5 in a direction along the normal to the tip enveloping surface 3 at the position of each grating tip 4. The grating groove is a groove portion formed by the grating side surface 2 of the k-th grating ring and the grating surface 1 of the (k+1)-th grating ring.

When the grating side surface is parallel to the normal to the tip enveloping surface, if the design diffraction order m(j, k) is determined for the k-th grating ring in the j-th diffraction grating portion such that the scalar diffraction efficiency is high over a wide wavelength range, the grating height d0(j, k) is expressed as follows:

$$d0(j,k) = m(j,k) \cdot \lambda / \{ni \cdot \cos \theta i(j,k) - nd \cdot \cos \theta d(j,k)\} \qquad (5).$$

In contrast thereto, this embodiment assumes a case in which the entering light ray proceeds towards a direction away from an optical axis, and therefore the grating side surface 2 is inclined oppositely to the grating surface 1 with respect to the normal by the same angle as the incident angle of the light ray (including not only strictly the same angle but also an angle that can be considered the same). Namely, the grating side surface 2 is set such that the angle (grating apex angle) formed between the grating side surface 2 and the grating surface 1 is larger than that of the case in which the grating side surface 2 is not inclined with respect to the normal. In this case, the lowermost point of the grating groove 5 is located closer to the grating tip 4 than the case in which the grating side surface 2 is not inclined. Therefore, the distance d(j, k) between the grating tip 4 and the lowermost point of the grating groove 5 is smaller than d0(j, k) in the direction along the normal to the tip enveloping surface 3 at each grating tip position.

Since the grating surface of the grating ring is determined based on a phase function and d0(j, k), the lowermost point of the grating groove of each grating ring in a cross section containing a center of the grating ring is determined as an intersecting point of this grating surface and the inclined grating side surface. Since the grating apex angle in the embodiment is set larger than that of the case in which the grating side surface is not inclined, the value of d(j, k) satisfies the conditional expression (4).

2. When the grating side surface is inclined to the same side as that of the grating surface with respect to the normal to the tip enveloping surface (normal at each grating tip position), that is, when the grating side surface is inclined to a side on which an angle (grating apex angle) formed by the grating side surface and the grating surface is smaller than that when the grating side surface is parallel to the above normal, the following conditional expressions are satisfied:

$$\theta d(j,k) = \sin-1[\{ni \cdot \sin\theta i(j,k) - m(j,k) \cdot \lambda / P(j,k)\}/n_d] \geq \theta i(j,k) \quad (6)$$

$$M(k) = \sum_{j=1}^{s} \{m(j,k)\} = const. \quad (2)$$

$$\theta i(j,k) \leq \theta \leq \theta d(j,k) \quad (7)$$

where the parameters such as θi(j, k), θd(j, k), and θ have the same meaning as those in the case with the above section 1.

Figure 11A:
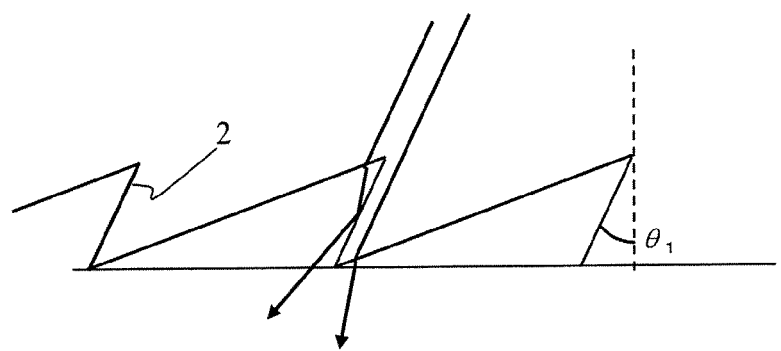
FIG. 11A is a diagram for explaining generation of unnecessary light when grating side surfaces are inclined in a conventional diffractive optical element.

In this case, contrary to the case with the above section 1, as shown in FIG. 11A, even when the grating side surface 2 is inclined in a direction in which the grating apex angle becomes small by, for example the same angle as the incident angle, under the condition in which θd<θi is established, a component that impinges on the grating side surface at a certain angle and then are reflected or transmitted remain. In this case, setting the diffraction order m(j, k) for the respective diffraction grating portions at least in the kE-th grating ring such as to satisfy the conditional expression (6) enables suppression of light rays impinging on the grating side surface, whereby unnecessary diffracted light can be reduced.

Figure 22:
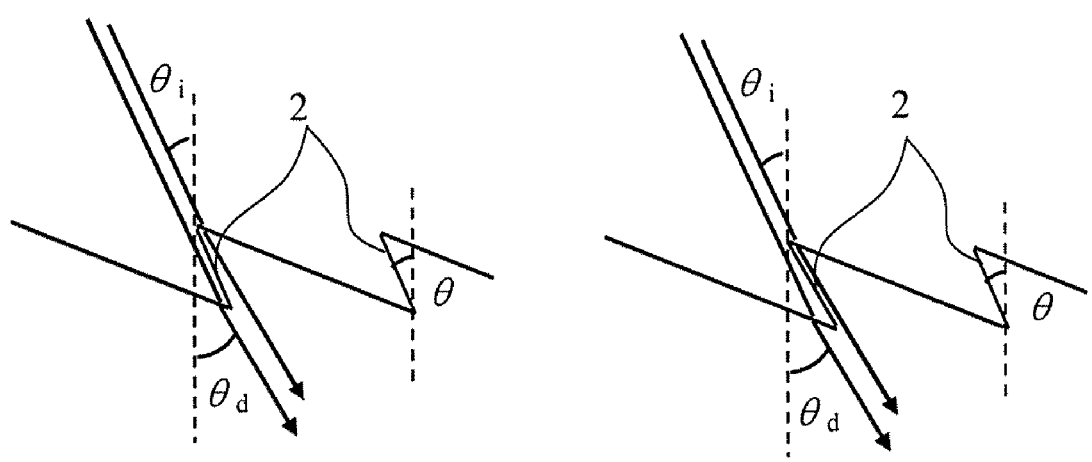
FIG. 22 is a diagram for explaining conditional expression (7) in the embodiment.

Upon satisfying the conditional expression (6), it is also necessary to take into account the inclination of the grating side surface in each diffraction grating portion. In this embodiment, as shown in FIG. 22, the inclination angle θ of the grating side surface 2 with respect to the normal to the tip enveloping surface 3 at the grating tip position of the k-th grating ring in the j-th diffraction grating portion satisfies the conditional expression (7). Namely, if the inclination angle θ is larger than the incident angle θi(j, k) of light rays in that grating ring and smaller than the diffraction angle θd(j, k), there are almost no light rays impinging on the grating side surface 2 at a certain angle. Accordingly, generation of unnecessary light is suppressed.

In this case, it is more preferable that the grating height d(j, k) in the j-th diffraction grating portion satisfy the following condition:

$$d(j,k) \geq m(j,k) \cdot \lambda / \{ni \cdot \cos\theta i(j,k) - nd \cdot \cos\theta d(j,k)\} \quad (8).$$

Figure 11B:
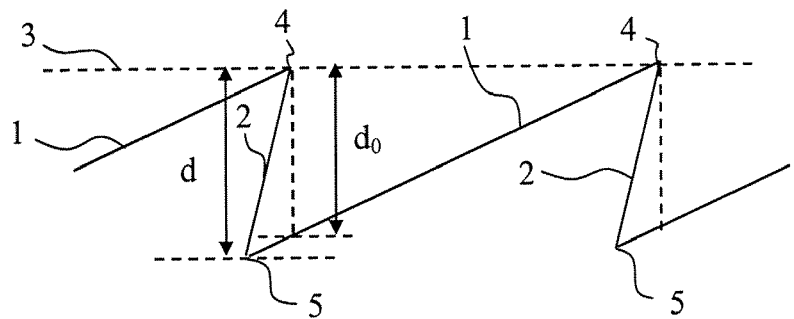
FIG. 11B is a diagram showing definition of a grating height when the grating side surfaces are inclined in the diffractive optical element of the embodiment.

Since this embodiment assumes the case in which the entering light ray proceeds toward the direction away from the optical axis, as shown in FIG. 11B, the grating side surface 2 is inclined to the same side as the grating surface 1 with respect to the normal by the same angle as the incident angle of the light ray (including not only strictly the same angle but also an angle that can be considered the same). Namely, the grating side surface 2 is set such that the angle (grating apex angle) formed between the grating side surface and the grating surface 1 is smaller than that of the case in which the grating side surface 2 is not inclined. In this case, the lowermost point of the grating groove 5 is located farther from the grating tip 4 than the case in which the grating side surface 2 is not inclined. Therefore, the distance d(j, k) between the grating tip 4 and the lowermost point of the grating groove 5 is larger than the grating height d0(j, k) in the case in which the grating side surface 2 is not inclined, in the direction along the normal to the tip enveloping surface 3 at each grating tip position. Thus, the value of the grating height d(j, k) satisfies the conditional expression (8).

In both of the above cases described in the sections 1 and 2, the incident angle θi(j, k) in this embodiment may be defined as a centroid angle or an average angle of an incident angle distribution of an effective light ray flux entering the k-th grating ring.

The effective light ray flux entering from the ocular optical system or an image-forming element, which are described later, into each diffraction grating portion has a certain width depending on view angles. The diffraction efficiency in the k-th grating ring in the j-th diffraction grating portion is determined based on a selected light ray that has a specific incident angle (design incident angle) as an entering light ray. The design incident angle should preferably be selected such that there is a smallest possible incident angle difference between the light ray having the design incident angle and other light rays having other incident angles, or such that the design incident angle has a highest possible proportion among the entire effective incident angle distribution.

Employing an angle that corresponds to the centroid angle of the incident angle distribution of the entire effective light ray flux or the average angle thereof as the design incident angle in this manner increases the proportion of the light rays having the design incident angle or incident angles close thereto, that is, decreases the proportion of light rays having incident angles significantly different from the design incident angle. Thereby a decrease of the diffraction efficiency can be suppressed.

This embodiment is particularly effective when the incident angle θi(j, k) is not equal to 0 (that is, θi(j, k)≠0) in all the k-th grating rings of the diffraction grating portions other than the first (j=1) diffraction grating portion.

Figure 12A:
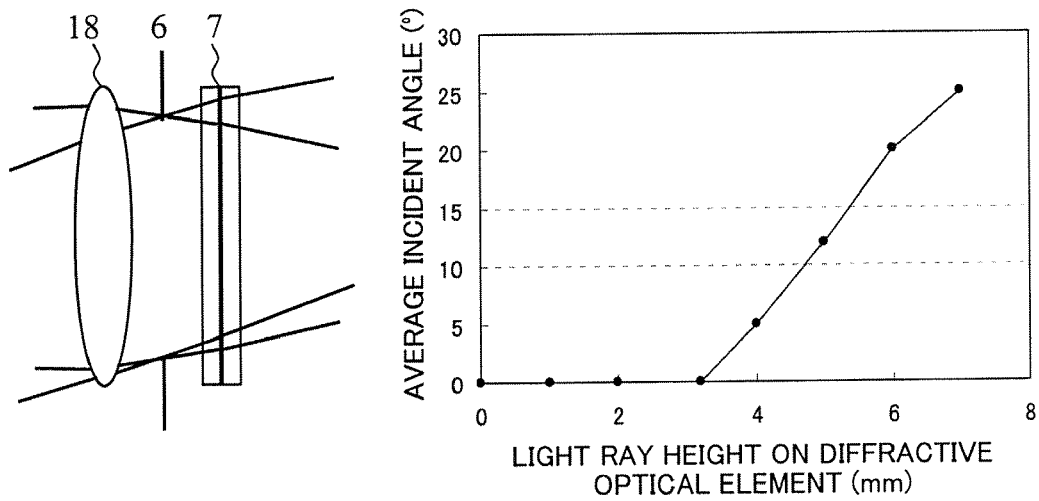
FIG. 12A is a schematic diagram showing a configuration of an optical system using the diffractive optical element of the embodiment, and a graph showing a relationship between a light ray height and an average incident angle on the diffractive optical element.

As shown in FIG. 12A, in an optical system including the diffractive optical element 7 (reference numeral 18 represents an optical element other than diffractive optical element 7), when an pupil (entrance pupil or exit pupil) 6 of this optical system is large and is closely distanced from the diffractive optical element 7, an area where the above-described design incident angle is zero may become wide.

Even if the grating ring pitch is small, if the incident angle θi(j, k) is zero, the sign of θd(j, k) is opposite to that of the incident angle, and a diffracted light ray from each diffraction grating portion proceeds to the direction away from the grating side surface. Therefore, it is not necessary to satisfy the conditional expression (1) or (6). Accordingly, the above-described effect is maximally achieved when θi(j, k)≠0 is established as mentioned above.

In this embodiment, the incident angle θi(j, k) may also be defined as an angle of a light ray passing through the k-th grating ring and a center of the pupil (entrance pupil or exit pupil) of the optical system using this diffractive optical element, with respect to the normal to the tip enveloping surface. Alternatively, the incident angle θi(j, k) may also be defined as an incident angle of a light ray that passes through the k-th grating ring and forms a maximum view angle of the optical system using this diffractive optical element.

Figure 12B:
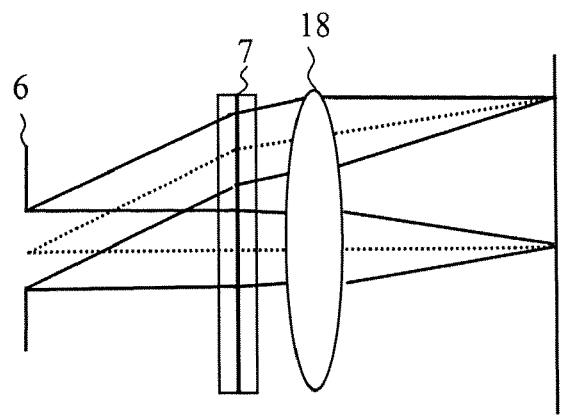
FIG. 12B is a schematic diagram showing a configuration of an optical system using the diffractive optical element of the embodiment.

As mentioned above, the design incident angle θi(j, k) should preferably be determined in consideration of the incident angle distribution of the effective light ray flux passing through the k-th grating ring. However, as shown in FIG. 12B, if the view angle of the optical system is large, and there is no surface having an optical power between its pupil and the diffractive optical element, with the pupil and the diffractive optical element being distanced from each other, then the incident angle of the light ray that passes through the center of the pupil 6 and each grating ring is substantially the same as the centroid angle or average angle of the incident angle distribution mentioned above.

In this case, generally, the light ray height on the diffractive optical element of the maximum view angle light ray passing through the center of the pupil does not cover the entire effective area on the diffractive optical element. Therefore, the maximum view angle of the optical system may be used as the design incident angle with respect to an area on the outer side from the grating ring into which the maximum view angle light ray passing through the center of the pupil enters.

The diffractive optical element configured as described above is used in an image display apparatus including an image-forming element such as a liquid crystal panel or a self-light-emitting element that forms an original image, and an ocular optical system for guiding light from this image-forming element to an exit pupil at which an observer's eye is disposed. The ocular optical system enlarges the original image to present the enlarged image to the observer's eye.

The diffractive optical element in such an image display apparatus is disposed between the image-forming element and the ocular optical system or between the ocular optical system and the observer's eye (exit pupil).

For example, a head-mounted display (HMD) mounted on a head of an observer is desired to secure a wide view angle as well as to be a lightweight apparatus with a most compact possible configuration. Japanese Patent No. 2911750 discloses an example in which a prism having three free-formed surfaces (rotationally asymmetric surfaces) is used as the ocular optical system in order to achieve these requirements. In this example, since a single resin-made prism is used, it is difficult to correct chromatic aberration of magnification caused by its dispersion. It is possible to perform achromatizing by adding a glass lens in the optical system, which will, however, increase the volume and weight of the apparatus, and reduce the advantage of using a free-formed surface prism.

It is extremely effective to use a thin diffractive optical element for the purpose of achromatizing in such a case, in terms of preventing an increase in volume and weight of the apparatus. Diffraction gratings can be formed on the free-formed surface, but then the grating rings will have a complex shape that is not axisymmetric and concentric because of the decentered shape of the free-formed surface. At any rate, forming diffraction gratings on a complex-shape free-formed surface itself is not easy. It is, moreover, necessary to adjacently dispose plural diffraction grating surfaces that are formed of mutually different materials in order to secure a high diffraction efficiency over a wide wavelength range, but it is very difficult to adjacently dispose such complex-shape free-formed surfaces precisely to an order of microns.

Figure 13A:
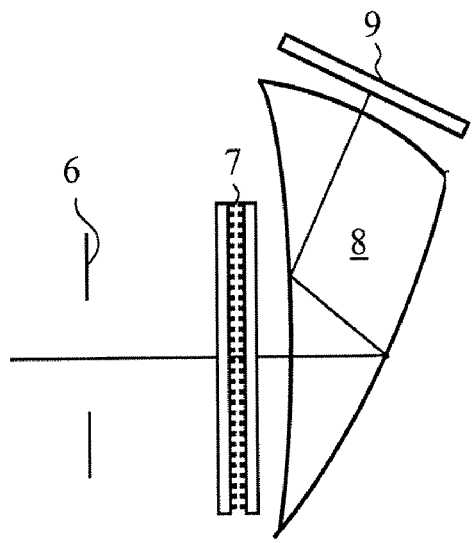
FIG. 13A is a diagram showing an overall configuration of an image display apparatus in the embodiment.
Figure 13B:
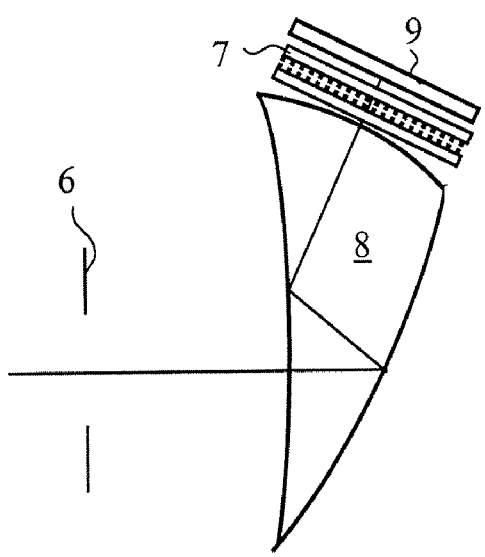
FIG. 13B is a diagram showing another overall configuration of the image display apparatus in the embodiment.

Accordingly, in this embodiment, as shown in FIG. 13A and FIG. 13B, a planar diffractive optical element 7 is disposed between a prism (ocular optical system) 8 and an exit pupil 6 or between an image-forming element 9 and the prism 8.

In particular, with the diffractive optical element 7 disposed between the prism 8 and the exit pupil 6 as shown in FIG. 13A, plural grating rings can be formed axisymmetrically and concentrically, which will make production easier. In the configuration shown in FIG. 13A, as compared to that shown in FIG. 13B, the incident angle of light rays entering the diffraction optical element 7 is larger in an area where the view angle is large, thereby making the influences caused by the grating side surface greater. Therefore, as mentioned above, the grating side surface may be inclined by the same angle as the incident angle of the light rays, and the diffraction order may be set such that diffracted light rays do not proceed toward the grating side surface, to avoid generation of unnecessary light even more effectively.

The incident angle θi(j, k) may be an incident angle of a light ray passing through the k-th grating ring and a point on the optical axis at a position farther away from the diffractive optical element than the exit pupil of the display optical system (observation optical system) including this diffractive optical element and the ocular optical system.

Figure 14A:
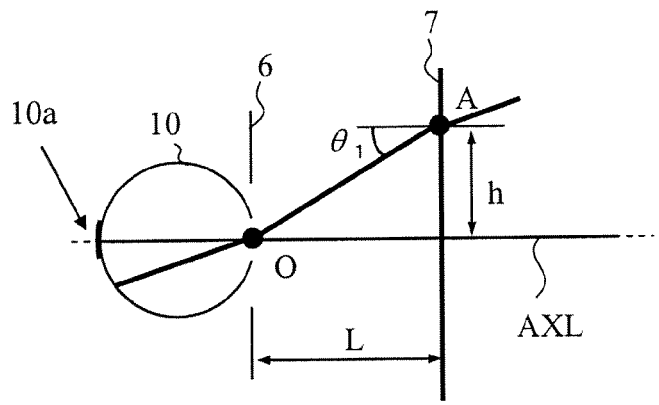
FIG. 14A is a conceptual diagram showing a light ray entering an eye ball from a peripheral portion of an image when the eye ball is directed in an optical axis direction.
Figure 14B:
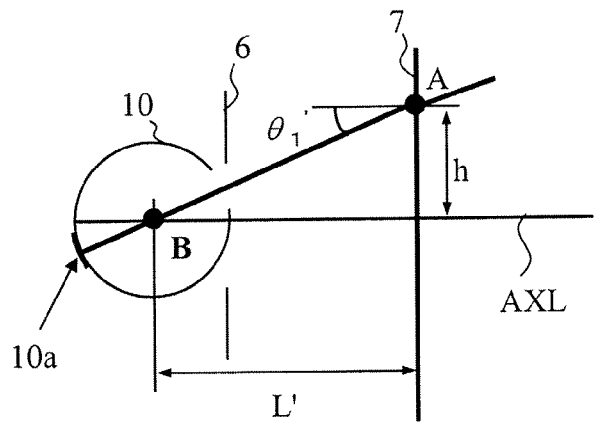
FIG. 14B is a conceptual diagram showing a light ray entering the eye ball from the peripheral portion of the image when the eye ball is directed towards the peripheral portion of the image.

FIG. 14A and FIG. 14B show an example of an optical design in which an pupil of an observer's eye ball 10 is disposed at a position of the exit pupil 6 of the optical system so as to make a distance (eye relief) between the eye ball 10 and a frontmost surface of the optical system viewed from an eye ball side as long as possible. Such an optical design is performed with respect to each light ray that emerges from the position of the exit pupil 6 and has a predetermined view angle in backward ray tracing, which will be described later. The exit pupil 6 is an exit pupil of the display optical system (entire optical system) including the diffractive optical element 7 and the ocular optical system described above.

The same is applied when determining a phase function of the diffractive optical element 7. The specific shape of each grating ring of the diffractive optical element 7 is determined based on the phase function.

In the following description, tracing a light ray in its proceeding direction from an image-forming element (not shown) toward the exit pupil 6 will be referred to as "forward ray tracing", and tracing this light ray in the opposite direction from the exit pupil 6 will be referred to as "backward ray tracing".

The configuration shown in FIG. 14A and FIG. 14B is an example in which the grating height d is set such as to achieve a maximum diffraction efficiency, where θ1 represents an incident angle of a light ray entering from the center O of the exit pupil 6 to a point A on the diffractive optical element 7 in the backward ray tracing. In this configuration, when the eye ball 10 (observer's visual axis) is directed in a direction of the optical axis AXL (direction toward a center of a displayed image), the diffraction efficiency of the design diffraction order light passing through the pupil of the eye ball 10 and reaching a retina thereof in the forward ray tracing is maximum, and thereby the diffraction efficiency of unnecessary diffraction order light is suppressed to minimum.

When observing a peripheral portion of the displayed image, however, the observer rotates the eye ball 10 in a direction of the peripheral portion as shown in FIG. 14B. The light ray passing through the center of the pupil at this time is not a light ray that passes through the center of the exit pupil 6 but a light ray that passes through a rotation center B of the eye ball 10 or the vicinity thereof. When this light ray impinges on the point A on the diffractive optical element 7 in the backward ray tracing, its incident angle is θ1', which is different from that of FIG. 14A. The grating height d at the point A is optimized for the incident angle θ1, and not optimized for the incident angle θ1'. Therefore, when the observer observes the peripheral portion of the displayed image by rotating the eye ball 10, the intensity of observed unnecessary diffracted light is increased.

When the eye ball 10 is directed in the direction of the optical axis AXL (hereinafter referred to simply as "optical axis direction") as shown in FIG. 14A, a light ray from the point A through the center of the pupil in the forward ray tracing reaches a portion of the retina outside a part called a central fovea 10a that has a highest sensitivity and a spatial resolving power in the retina. Therefore, even if there slightly remains unnecessary light, the degree of visibility is low.

In contrast, when the eye ball 10 rotates from the state in which it is directed in the optical axis direction to a state in which it is directed in a direction of the point A as shown in FIG. 14B, the light ray from the point A reaches the central fovea 10a, and thereby even slight unnecessary light is readily visible. As a result, an image defect occurs.

Accordingly, in this embodiment, in order to determine the grating height of a certain grating ring on the diffractive optical element 7, the incident angle and the diffraction angle may be an incident angle and a diffraction angle of a light ray that connects a point on that grating ring and a specific point located farther from the diffractive optical element 7 than the exit pupil 6 on the optical axis of the optical system. The grating height is then determined such that the diffraction efficiency of the light ray passing through this specific point in the design diffraction order becomes maximum.

This suppresses unnecessary diffracted light when the eye ball 10 rotates from the state in which it is directed in the optical axis direction, thereby making the unnecessary diffracted light hardly visible even when it reaches the central fovea 10a. Contrary, with the eye ball 10 being directed in the optical axis direction, even when slight unnecessary light entering the center of the pupil (exit pupil) at a certain angle is generated, it is hardly visible as unpleasant flare light since the unnecessary light reaches a part that has a low visual sensitivity on the retina outside the central fovea 10a. In practice, light other than the design diffraction order light is defocused on the retina, so that the degree of visibility is even lower.

It is said that the distance from the pupil to the rotation center ○ in the eye ball 10 is generally about 10 mm, and therefore the above specific point should most desirably be set so as to separate from the exit pupil 6 by a distance corresponding thereto on a far side from the diffractive optical element 7. However, as long as the condition L'>L is satisfied where L represents a distance (eye relief) from a frontmost surface in the optical system to the exit pupil 6 when viewed from an eye ball side and L' represents a distance from the frontmost surface to the specific point on the optical axis, the above effect can be achieved to some extent.

Combining the setting of the grating height and the settings of the grating side surface and the diffraction order as described above can provide an even higher effect of suppressing the unnecessary light than will be achieved as compared to a case where only one of these is employed.

Specific numeric examples will be shown below as embodiments of the present invention.

Embodiment 1

Figure 15:
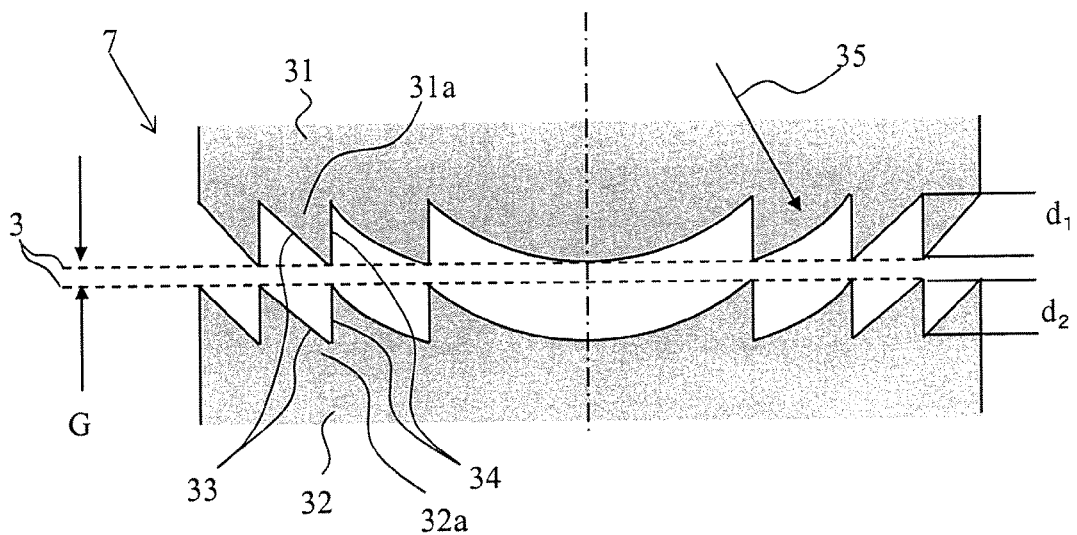
FIG. 15 is a schematic diagram showing a structure of a two-layer diffractive optical element of a first embodiment.

FIG. 15 shows a schematic structure of a diffractive optical element 7 of a first embodiment (Embodiment 1). The diffractive optical element 7 is constituted by a first diffraction element layer 31 and a second diffraction element layer 32 formed of two ultraviolet curable resins which are mutually different materials. These layers 6 and 7 are disposed such that a gap (air layer) G exists between their diffraction grating portions 31a and 32a. A tip enveloping surface 3 of each diffraction grating portion is a flat surface. Although, in practice, a grating side surface 34 of each grating ring in each of the diffraction grating portions 31a and 32a is inclined oppositely to a grating surface 33 of each grating ring with respect to a normal to the tip enveloping surface 3 at each grating tip, the illustration in FIG. 15 is simplified and the grating side surface 34 is shown as being parallel to the normal.

In Embodiment 1, the gap G between the diffraction grating portions 31a and 32a (between the tip enveloping surfaces 3) is 1.5 μm. A design wavelength of the diffractive optical element 7 is λ=587.56 nm. A refractive index of the material for the first diffraction element layer 31 is n1 (λ)=1.52415, and the dispersion is νd=51.57. A refractive index of the material for the second diffraction element layer 32 is n2 (λ)=1.63554, and the dispersion is νd=22.75. Each diffraction element layer has a thickness of 50 μm.

The first (j=1) diffraction grating portion 31a formed in the first diffraction element layer 31 has a positive optical power, while the second (j=2) diffraction grating portion 32a formed in the second diffraction element layer 32 has a negative optical power.

An incident angle of a light ray 35 entering a certain grating ring on the diffractive optical element 7, in the backward ray tracing, is an average angle of an incident angle distribution of the entire effective light ray flux in the optical system using this diffractive optical element 7. This light ray 35 proceeds in a direction away from the optical axis of the optical system, the optical axis being indicated by a one-dot-chain line in the drawing.

It is assumed that an incident angle θ1 of the light ray entering the first diffraction grating portion 31a is 16.100 [°], and a pitch P of the grating ring into which this light ray enters is 31.154 [μm]. Under this conditions, respective design diffraction orders m1 and m2 of the first and second diffraction grating portions 31a and 32a are set as follows so that the first-order (design diffraction order) diffraction efficiency in total of the first and second diffraction grating portions 31a and 32a is high over a wide wavelength range:

m1=+9.2 m2=−8.2.

An order containing a decimal point, for example m1=+9.2 means that +9th-order diffracted light and +10th-order diffracted light are both generated at certain proportions. A +9.2th(m1)-order diffraction angle is an angle formed by light rays passing through centroids of the +9th-order diffracted light and the +10th-order diffracted light, based on an intensity ratio of the +9th-order diffracted light and the +10th-order diffracted light. Therefore, though in a small ratio, light rays of some diffraction orders diffracted toward the grating side surface 34 remain.

In Embodiment 1, the grating side surface 34 is inclined, such that the grating side surface 34 is parallel to the entering light ray, with respect to the normal to the tip enveloping surface 3 in a direction in which a grating apex angle formed between the grating side surface 34 and the grating surface 33 becomes larger than that when the grating side surface is parallel to the normal. The grating side surface 34 in the first diffraction grating portion 31a is inclined with respect to the normal by the same angle as the incident angle $\theta 1$ of the entering light ray.

The grating side surface 34 in the second diffraction grating portion 32a is inclined with respect to the normal by the same angle as a diffraction angle of the light ray diffracted at the first diffraction grating portion 31a, i.e., an incident angle $\theta 2$ of the light ray entering the second diffraction grating portion 32a.

Figure 16:
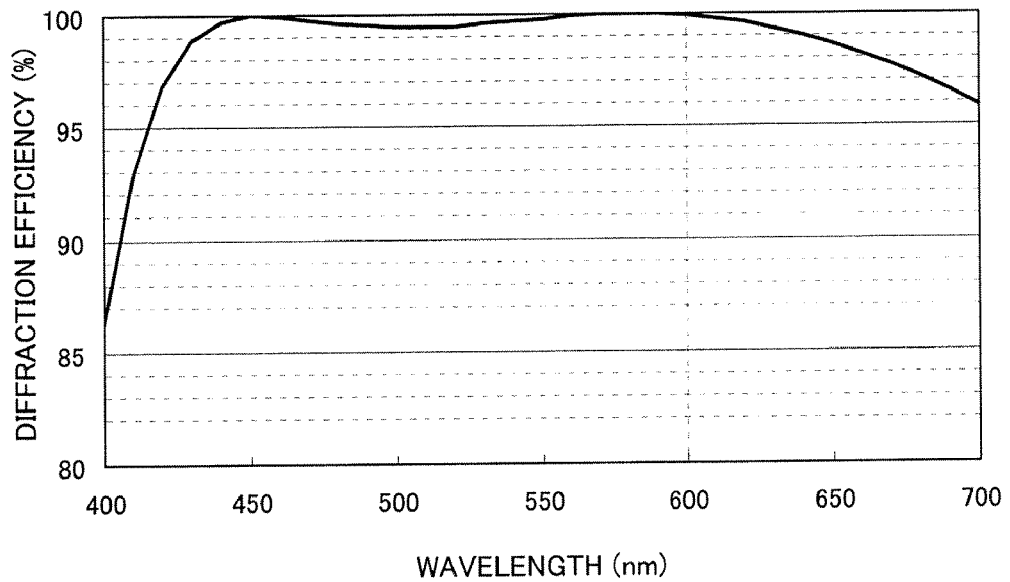
FIG. 16 is a graph showing scalar diffraction efficiency of the two-layer diffractive optical element of the first embodiment.

FIG. 16 shows the scalar diffraction efficiency for each wavelength of the diffractive optical element 7 of Embodiment 1. As can be seen from this figure, the diffractive optical element 7 of Embodiment 1 achieves a high diffraction efficiency of 98% or more in a wavelength range of 430 to 670 nm.

The diffraction angles $\theta 2$ and $\theta 3$ at the first and second diffraction grating portions 31a and 32a are as follows:

$$\theta 2 = \sin^{-1}[\{n1 \cdot \sin \theta 1 - m1 \cdot \lambda/P\}/1] = 14.4247 \, [°]$$

$$\theta 3 = \sin^{-1}[\{1 \cdot \sin \theta 2 - m2 \cdot \lambda/P\}/n2] = 14.2921 \, [°].$$

The angles $\theta 1$ and $\theta 2$ at the first diffraction grating portion 31a and the angles $\theta 2$ and $\theta 3$ at the second diffraction grating portion 32a both satisfy the relationship of (diffraction angle) $\leq$ (incident angle). This reduces a ratio of the diffracted light entering the grating side surface 34 inclined by the same angle as the incident angle, whereby generation of unnecessary light caused by this diffracted light is suppressed.

When the grating side surfaces 34 in the first and second diffraction grating portions 31a and 32a are not inclined with respect to the normal to the tip enveloping surfaces 3, the grating heights d10 and d20 are as follows:

$$d10 = m1 \cdot \lambda / \{n1(\lambda) \cdot \cos \theta 1 - 1 \cdot \cos \theta 2\} = 9.901 \, [\mu m]$$

$$d20 = m2 \cdot \lambda / \{1 \cdot \cos \theta 2 - n2(\lambda) \cdot \cos \theta 3\} = 7.331 \, [\mu m].$$

However, since the grating side surface 34 is inclined with respect to the normal to the tip enveloping surface 3 in a direction in which the grating apex angle becomes larger in Embodiment 1, the lowermost point in the grating groove is an intersecting point of the grating side surface 34 inclined with respect to the normal and the grating surface 33 expressed by the phase function. Therefore, the grating heights d1 and d2 of the first and second diffraction grating portions 31a and 32a satisfy the following conditions:

$$d1 \leq d10$$

$$d2 \leq d20$$

If light rays entering each grating ring proceed in a direction in which they approach the optical axis, the grating side surfaces 34 are inclined relative to a normal to the enveloping surface 3 in a direction in which the grating apex angle becomes smaller than that of the case in which the grating side surfaces are parallel to the normal. In this case, the grating heights d1 and d2 satisfy the following conditions:

$$d1 \geq d10$$

$$d2 \geq d20.$$

Embodiment 2

Figure 17:
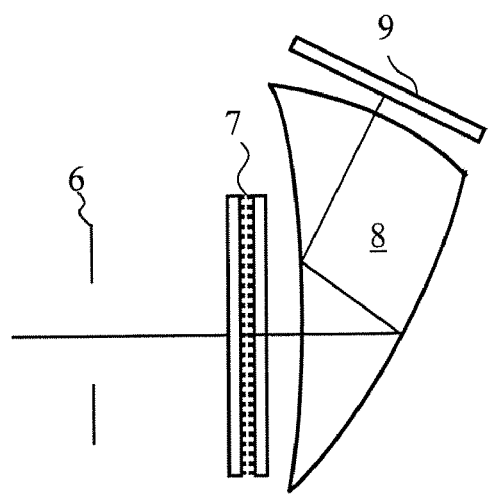
FIG. 17 is a schematic diagram showing an overall configuration of an image display apparatus that is a second embodiment of the present invention.

FIG. 17 shows a second embodiment (Embodiment 2). Embodiment 2 includes, along a proceeding direction of a light ray, a light source (not shown), an image-forming element 9 formed by a transmissive liquid crystal panel, an ocular prism 8 having decentered free-formed surfaces, and a diffractive optical element 7.

The diffractive optical element 7 is configured such that two diffraction element layers are disposed with a gap between their diffraction grating portions. The tip enveloping surfaces of the respective diffraction grating portions are, although not shown, a flat surface. The grating side surface of each grating ring is inclined oppositely to the grating surface with respect to the normal to the tip enveloping surface 3 at each grating tip.

The diffractive optical element 7 has an optical power. The diffractive optical element 7 is disposed at a position closest to an exit pupil 6 of a display optical system including this diffractive optical element 7 and the ocular prism 8 among positions of surfaces having optical powers. The two diffraction grating portions are respectively formed on a planar base member (substrate).

The exit pupil 6 is located at a position of 20 mm away from a substrate surface of an exit pupil side diffraction grating portion in the two diffraction grating portions, and has a pupil diameter of $\phi 14$ mm. The grating rings are formed rotationally-symmetrically and concentrically with respect to the optical axis. The phase function $\phi(r)$ can be determined as follows:

$$\phi(r) = C1 \cdot r2 + C2 \cdot r4 + C3 \cdot r6 + C4 \cdot r8$$

$$C1 = -9.8792 \cdot 10 - 4$$

$$C2 = 1.5989 \cdot 10 - 7$$

$$C3 = 2.9680 \cdot 10 - 9$$

$$C4 = -4.1182 \cdot 10 - 12$$

where r represents a distance from the optical axis.

A radius of each grating ring can be determined as R(k) that satisfies the following expression:

$$\phi(R(k)) = -k \cdot \lambda.$$

A grating ring pitch of the k-th grating ring is expressed as follows:

$$P(k) = R(k) - R(k-1).$$

In the backward ray tracing, the exit pupil side diffraction grating portion of the two diffraction grating portions forming the diffractive optical element is referred to as a first diffraction grating portion, while an image-forming element side diffraction grating portion is referred to as a second diffraction grating portion. The first diffraction grating portion in this case has a positive optical power, while the second diffraction grating portion has a negative optical power.

Figure 18:
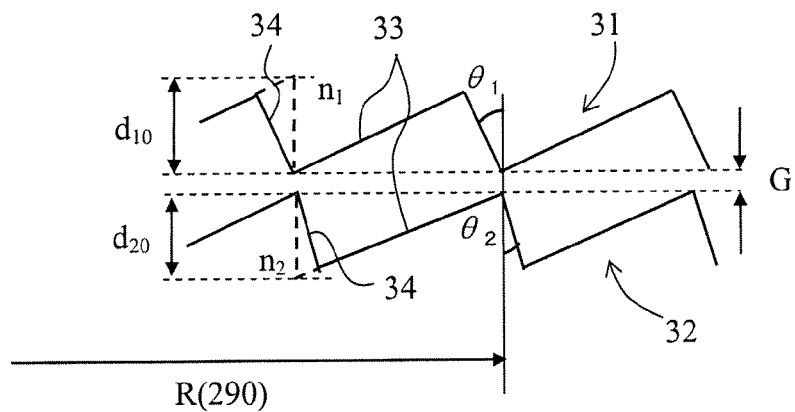
FIG. 18 is a diagram for explaining parameters of a two-layer diffractive optical element used in the second embodiment.

As shown in FIG. 18, the diffraction orders m1 and m2 in the first and second diffraction grating portions 31 and 32 are determined for the 290th (k=290) grating ring whose grating ring pitch is the smallest.

Various parameters of the diffractive optical element in Embodiment 2 are as follows:

A design wavelength of the diffractive optical element: λ=587.56 nm.

A refractive index of the material for the first diffraction grating portion: n1 (λ)=1.52415 (dispersion νd=51.57)

A refractive index of the material for the second diffraction grating portion: n2 (λ)=1.63554 (dispersion νd=22.75)

A thickness of each diffraction element layer: 50 μm

A refractive index of the material for each substrate: n3 (λ)=1.57090 (dispersion νd=33.81)

A thickness of each substrate: 1.0 mm

A distance (gap) G between the first and second diffraction grating portions: 1.5 μm In the 290th grating ring, the radius R (290) is 13.958 [mm] and the pitch P (290) is 29.667 [μm], which are determined from the above phase function. When the rotation center of the eye ball (specific point) is located at a position of 10 mm away in the optical axis direction from the position of the exit pupil and a light ray entering the 290th grating ring is a light ray from this specific point, a view angle is 24.4975° and an incident angle is θ1=15.787 [°].

The grating side surfaces 34 of the first and second diffraction grating portions 31 and 32 are inclined with respect to the normal to the tip enveloping surface by the same angle as the incident angle of the light ray entering each diffraction grating portion. Thereby, the grating apex angle formed between the grating side surface 34 and the grating surface 33 is larger than that in the case where the grating side surface 34 is parallel to the normal.

If the total diffraction order M of the first and second diffraction grating portions 31 and 32 is +1, an emergent angle (that is, a diffraction angle) θ3 of the light ray emerging from the second diffraction grating portion is as follows:

$$\theta 3 = \sin^{-1}[\{n1 \cdot \sin \theta 1 - M \cdot \lambda / P\}/n2] = 13.9702 \, [°].$$

This angle θ3 in the 290th grating ring must be invariable irrespective of the diffraction orders m1 and m2 of the first and second diffraction grating portions 31 and 32. Namely, the condition of M=m1+m2=+1 must be satisfied.

Under this condition, the diffraction orders m1 and m2 are determined such that the diffraction efficiency in total of the first and second diffraction grating portions 31 and 32 is high over a wide wavelength range. In this embodiment, they are determined as follows:

$$m1 = +8.7$$

$$m2 = -7.7.$$

In this case, when the grating side surfaces of the first and second diffraction grating portions are not inclined, the respective grating heights d10 and d20 are as follows:

$$d10 = m1 \cdot \lambda / \{n1(\lambda) \cdot \cos \theta 1 - 1 \cdot \cos \theta 2\} = 9.589 [\mu m]$$

$$d20 = m2 \cdot \lambda / \{1 \cdot \cos \theta 2 - n2(\lambda) \cdot \cos \theta 3\} = 7.107 [\mu m].$$

The scalar diffraction efficiency in total of the first and second diffraction grating portions is calculated as follows:

$$\eta(h,\lambda) = \sin c2[\pi \cdot \{(m1+m2) - \{\Phi 1(h,\lambda) + \Phi 2(h,\lambda)\}/\lambda\}]$$

where Φ1 and Φ2 represent optical path differences in the first and second diffraction grating portions 31 and 32, and h=13.958 in Embodiment 2.

Figure 19:
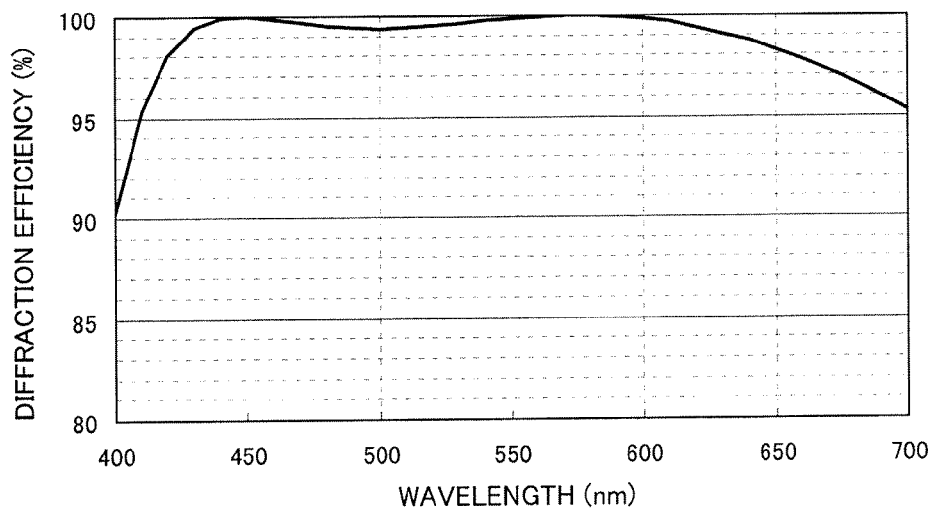
FIG. 19 is a graph showing scalar diffraction efficiency of the two-layer diffractive optical element of the second embodiment.

FIG. 19 shows the diffraction efficiency for wavelengths of the diffractive optical element of Embodiment 2. The diffraction angle θ2 of the design diffraction order (m1=+8.7) in the first diffraction grating portion 31 is as follows:

$$\theta 2 = \sin^{-1}[\{n1 \cdot \sin \theta 1 - m1 \cdot \lambda / P\}/1] = 14.0251 \, [°].$$

Therefore, the diffraction angles in the first and second diffraction grating portions 31 and 32 have the following relationships with respect to the respective incident angles thereon:

The first diffraction grating portion: θ2=14.0251 [°]<θ1 (=15.787 [°])

The second diffraction grating portion: θ3=13.9702 [°]<θ2 (=14.0251 [°]).

These angles θ1, θ2, and θ3 satisfy the relationship of (diffraction angle)≦(incident angle). This reduces the ratio of diffracted light entering the grating side surface 34, whereby generation of unnecessary light caused by this diffracted light is suppressed.

For example, if a value larger than +8.747 is used as the diffraction order m1 of the first diffraction grating portion, the diffraction angle becomes larger than the incident angle at the second diffraction grating portion. This leads to generation of diffracted light impinging on the grating side surface, which increases the unnecessary light.

Description has been made of the case where the grating height is determined such that the diffraction efficiency is high in the design diffraction order of the light ray entering the diffractive optical element, the light ray passing through the specific point on the optical axis on the farther side from the diffractive optical element than the exit pupil, preferably passing through a point near the rotation center of the eye ball.

Namely, description has been made of the case where the grating height is set such that, when the eye ball is rotated to be directed towards the peripheral portion of the displayed image (direction toward, for example, the 290th grating ring), the generation of unnecessary diffracted light is suppressed in that direction.

When optimizing the grating height corresponding to the peripheral portion of the displayed image based on the design incident angle determined for a light ray from the center of the exit pupil, the light ray is assumed which enters the eye ball from the peripheral portion in a state where the eye ball is directed in the optical axis direction, i.e., towards a central portion of the displayed image.

When a light ray is assumed which passes through the center of the exit pupil and enters the 290th grating ring, the view angle is 34.129 [°] and the incident angle θ1 at the first diffraction grating portion is 21.5992 [°].

The diffraction orders m1 and m2 determined under this condition such that the diffraction efficiency in total of the first and second diffraction grating portions is high over a wide wavelength range and such that (diffraction angle)>(incident angle) is satisfied are as follows:

$$m1 = +11.2$$

$$m2 = -10.2.$$

In this case, the respective grating heights of the first and second diffraction grating portions when the grating side surfaces thereof are not inclined are as follows:

$$d10 = 11.663 [\mu m]$$

$$d20 = 8.800 [\mu m].$$

Figure 20:
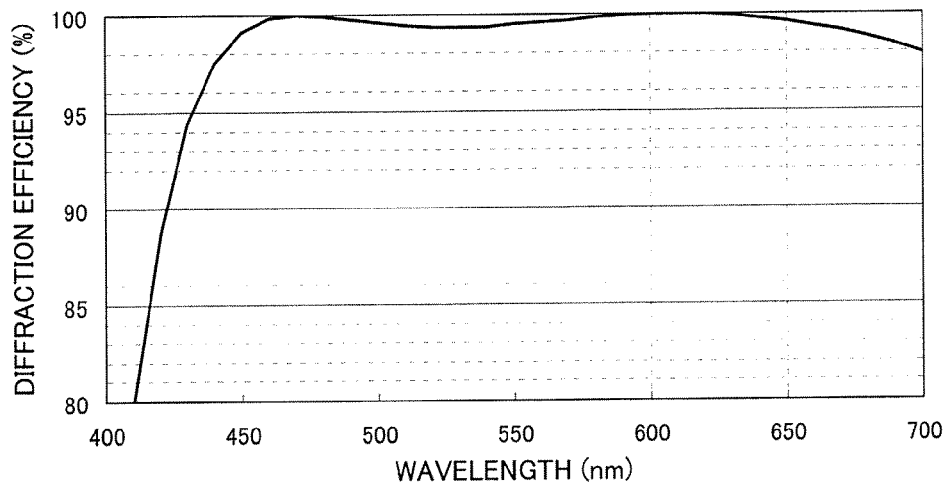
FIG. 20 is a graph showing scalar diffraction efficiency of a two-layer diffractive optical element optimized relative to light rays passing through a center of an exit pupil and entering a certain grating ring.

Further, the scalar diffraction efficiency for wavelengths in this case is shown in FIG. 20.

Assuming that the eye ball is directed toward the peripheral portion (for example, the 290th grating ring) when the diffractive optical element is optimized as described above. In this case, a light ray is considered which passes through a point near the rotation center of the eye ball (for example, a point on the optical axis farther from the diffractive optical element by 10 mm than the exit pupil) and the 290th grating ring. The view angle is 24.4975 [°] as mentioned above, and the incident angle θ1 at the first diffraction grating portion is θ1=15.787 [°].

When calculating the scalar diffraction efficiency for this light ray, first-order diffracted light of that light ray decreases, and thereby the diffraction efficiency of unnecessary diffracted light increases. This means that the unnecessary diffracted light that is not visible when the eye stares the central portion of the displayed image is clearly apparent when the eye ball is rotated to look at the peripheral portion of the displayed image. The degree of visibility is high at this time because the unnecessary diffracted light also enters the central fovea having a high sensitivity on the retina.

On the other hand, if the grating height is optimized such that no unnecessary diffraction order light is generated from the light ray passing through the position on the optical axis farther from the diffractive optical element than the exit pupil, then the unnecessary diffraction order light from the peripheral portion of the displayed image (that is, the 290th grating ring) may be seen when the eye ball is rotated to be directed in the optical axis direction. However, in this case, since the eye ball is directed (that is, the observer stares) in the optical axis direction, the unnecessary light from the peripheral portion reaches an area outside the central fovea of the retina, and thereby the degree of visibility is low.

Therefore, when setting the incident angle (and the diffraction angle) for the diffractive optical element, it is desirable to optimize the angle(s) for a light ray passing through a specific point on the optical axis farther from the diffractive optical element than the exit pupil, and not for a light ray passing through the center of the exit pupil.

As described above, according to the embodiments, even when a diffractive optical element having a small grating ring pitch and a high ratio of the grating height to the grating ring pitch is employed in an optical system with a large incident angle of light entering this diffractive optical element, the generation of unnecessary light for a design diffraction order light can be suppressed. Accordingly, high-quality images can be presented by an image display apparatus employing such a diffractive optical element.

Furthermore, the present invention is not limited to these embodiments and various variations and modifications may be made without departing from the scope of the present invention.

This application claims the benefit of Japanese Patent Application No. 2007-319250, filed on Dec. 11, 2007, which is hereby incorporated by reference herein in its entirety.

What is claimed is:

1. An image display apparatus comprising:
an image-forming element configured to form an original image;
an optical system configured to guide light from the image-forming element to an exit pupil; and
a diffractive optical element disposed between the image-forming element and the optical system or between the optical system and the exit pupil,
wherein the diffractive optical element includes plural diffraction grating portions formed of mutually different materials, the plural diffraction grating portions being disposed with a gap therebetween,
wherein each of the diffraction grating portions includes plural grating rings each having a grating surface and a grating side surface,
wherein, in each of the grating rings, the grating side surface is inclined oppositely to the grating surface with respect to a normal to an enveloping surface passing through apexes of the plural grating rings, and
wherein the diffractive optical element satisfies the following conditions for a k-th grating ring of the plural grating rings in a j-th diffraction grating portion of the plural diffraction grating portions, at least when $k=k_E$:

$$\theta_d(j, k) = \sin^{-1}[\{n_i \cdot \sin\theta_i(j, k) - m(j, k) \cdot \lambda / P(j, k)\}/n_d] \leq \theta_i(j, k)$$

$$M(k) = \sum_{j=1}^{s}\{m(j, k)\} = const.$$

$$\theta_d(j, k) \leq \theta \leq \theta_i(j, k)$$

where:
$\lambda$ represents a design wavelength of the diffractive optical element;
$\theta_i(j, k)$ represents an incident angle formed by a light ray passing through the k-th grating ring in the j-th diffraction grating portion and the exit pupil with the normal to the enveloping surface, the light ray being incident onto the diffractive optical element and further passing through a specific point on an optical axis of a display optical system including the diffractive optical element and the optical system, and the specific point being located farther from the diffractive optical element than an exit pupil of the display optical system,
$|\theta_i(j,k)|$ being smaller than a maximum view angle of the optical system;
$\theta_d(j, k)$ represents a diffraction angle of light of a design diffraction order at the k-th grating ring in the j-th diffraction grating portion;
$m(j, k)$ represents the design diffraction order of the k-th grating ring in the j-th diffraction grating portion;
$P(j, k)$ represents a pitch between the k-th grating ring and a (k−1)-th grating ring;
$k_E$ represents a number of the grating ring where the pitch is minimum or where $\theta_i(j, k)$ is maximum;
$M(k)$ represents a diffraction order of the diffractive optical element;
$n_i$ and $n_d$ respectively represent refractive indexes of an entrance side medium and a diffraction side medium in the j-th diffraction grating portion;
s represents a total number of the plural grating rings in the j-th diffraction grating portion; and
θ represents an angle which the grating side surface forms with the normal to the enveloping surface.

2. An image display apparatus according to claim 1, wherein the diffractive optical element further satisfies the following condition:

$$d(j, k) \leq m(j, k) \cdot \lambda / \{n_i \cdot \cos\theta_i(j, k) - n_d \cos\theta_d(j, k)\}$$

where $d(j, k)$ represents a height of the k-th grating ring in the j-th diffraction grating portion in a direction along the normal.

3. An image display apparatus, comprising:
an image-forming element configured to form an original image;
an optical system configured to guide light from the image-forming element to an exit pupil; and a diffractive optical element disposed between the image-forming element and the optical system or between the optical system and the exit pupil, wherein the diffractive optical element includes plural diffraction grating portions formed of mutually different materials, the plural diffraction grating portions being disposed with a gap therebetween, wherein each of the diffraction grating portions includes plural grating rings each having a grating surface and a grating side surface, wherein in each of the grating rings, the grating side surface is inclined to a same side as the grating surface with respect to a normal to an enveloping surface passing through apexes of the plural grating rings, and wherein the diffractive optical element satisfies the following conditions for a k-th grating ring of the plural grating rings in a j-th diffraction grating portion of the plural diffraction grating portions, at least when $k=k_E$:

$$\theta_d(j,k) = \sin^{-1}[\{n_i \cdot \sin\theta_i(j,k) - m(j,k) \cdot \lambda / P(j,k)\}/n_d] \geq \theta_i(j,k)$$

$$M(k) = \sum_{j=1}^{s} \{m(j,k)\} = const.$$

$$\theta_i(j,k) \leq \theta \leq \theta_d(j,k)$$

where:

$\lambda$ represents a design wavelength of the diffractive optical element;

$\theta_i(j,k)$ represents an incident angle formed by a light ray passing through the k-th grating ring in the j-th diffraction grating portion and the exit pupil with the normal to the enveloping surface, the light ray being incident onto the diffractive optical element and further passing through a specific point on an optical axis of a display optical system including the diffractive optical element and the optical system, and the specific point being located farther from the diffractive optical element than an exit pupil of the display optical system, $|\theta_i(j,k)|$ being smaller than a maximum view angle of the optical system;

$\theta_d(j,k)$ represents a diffraction angle of light of a design diffraction order at the k-th grating ring in the j-th diffraction grating portion;

$m(j,k)$ represents the design diffraction order of the k-th grating ring in the j-th diffraction grating portion;

$P(j,k)$ represents a pitch between the k-th grating ring and a (k−1)-th grating ring;

$k_E$ represents a number of the grating ring where the pitch is minimum or where $\theta_i(j,k)$ is maximum;

$M(k)$ represents a diffraction order of the diffractive optical element;

$n_i$ and $n_d$ respectively represent refractive indexes of an entrance side medium and a diffraction side medium in the j-th diffraction grating portion;

s represents a total number of the plural grating rings in the j-th diffraction grating portion; and $\theta$ represents an angle which the grating side surface forms with the normal to the enveloping surface.

4. An image display apparatus according to claim 3, wherein the diffractive optical element further satisfies the following condition:

$$d(j,k) \geq m(j,k) \cdot \lambda / \{n_i \cos\theta_i(j,k) - n_d \cos\theta_d(j,k)\}$$

where $d(j,k)$ represents a height of the k-th grating ring in the j-th diffraction grating portion in a direction along the normal.

* * * * *